(12) United States Patent
Kobayashi et al.

(10) Patent No.: US 11,019,251 B2
(45) Date of Patent: May 25, 2021

(54) INFORMATION PROCESSING APPARATUS, IMAGE CAPTURING APPARATUS, INFORMATION PROCESSING METHOD, AND RECORDING MEDIUM STORING PROGRAM

(71) Applicant: CANON KABUSHIKI KAISHA, Tokyo (JP)

(72) Inventors: Masayuki Kobayashi, Yokohama (JP); Hisashi Kawabayashi, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/879,915

(22) Filed: Jan. 25, 2018

(65) Prior Publication Data

US 2018/0220065 A1    Aug. 2, 2018

(30) Foreign Application Priority Data

Jan. 30, 2017    (JP) .............................. JP2017-014208
May 24, 2017    (JP) .............................. JP2017-102803

(51) Int. Cl.
*H04N 5/232*    (2006.01)
*G06K 9/46*    (2006.01)
(Continued)

(52) U.S. Cl.
CPC ..... *H04N 5/23219* (2013.01); *G06K 9/00369* (2013.01); *G06K 9/4671* (2013.01);
(Continued)

(58) Field of Classification Search
None
See application file for complete search history.

(56) References Cited

U.S. PATENT DOCUMENTS 6,421,463 B1    7/2002 Poggio
7,991,193 B2    8/2011 Hampapur et al.
(Continued)

FOREIGN PATENT DOCUMENTS

EP    2487647 A1    8/2012
JP    2006-025238 A    1/2006
(Continued)

OTHER PUBLICATIONS

M. Bertozzi; A. Broggi; P. Grisleri; T. Graf; M. Meinecke; "Pedestrian Detection in Infrared Images," Proc. IEEE Intelligent Vehicle Symposium, pp. 662-667, 2003.
(Continued)

*Primary Examiner* — Dakshesh D Parikh
(74) *Attorney, Agent, or Firm* — Canon U.S.A, Inc. IP Division

(57) ABSTRACT

The present invention is directed to implementing at least one of speed-up of detection processing and reduction of misdetection. An information processing apparatus includes an acquisition unit configured to acquire a captured image, a first setting unit configured to set a plurality of detection areas of an object for the captured image, a second setting unit configured to set a condition for detecting an object on a first detection area and a second detection area set by the first setting unit, wherein the condition includes a detection size in the captured image, and a detection unit configured to detect an object satisfying the detection size set by the second setting unit from the plurality of detection areas set by the first setting unit.

21 Claims, 16 Drawing Sheets

(51) Int. Cl.
*G06K 9/00* (2006.01)
*G06K 9/62* (2006.01)

(52) U.S. Cl.
CPC ....... *G06K 9/6212* (2013.01); *H04N 5/23216* (2013.01); *H04N 5/23222* (2013.01); *H04N 5/23293* (2013.01); *H04N 5/232935* (2018.08); *G06K 2009/6213* (2013.01)

(56) References Cited

U.S. PATENT DOCUMENTS

| | | | | |
|---|---|---|---|---|
| 2003/0165198 | A1* | 9/2003 | Chen | H04N 7/18 375/240.29 |
| 2008/0166017 | A1* | 7/2008 | Ito | G08B 13/1968 382/103 |
| 2015/0215546 | A1* | 7/2015 | Adachi | H04N 5/23219 348/240.2 |
| 2015/0371376 | A1* | 12/2015 | Adachi | G06K 9/38 348/140 |

FOREIGN PATENT DOCUMENTS

| | | |
|---|---|---|
| JP | 2008016898 A | 1/2008 |
| JP | 2008-289006 A | 11/2008 |
| JP | 2010-140425 A | 6/2010 |
| JP | 2014-199506 A | 10/2014 |
| JP | 2016009877 A | 1/2016 |

OTHER PUBLICATIONS

Navneet Dalal; Bill Triggs; "Histograms of Oriented Gradients for Human Detection," Proceedings of the 2005 IEEE Computer Society Conference on Computer Vision and Pattern Recognition (CVPR '05), pp. 1-8.

Yajun Fang; Keiichi Yamada; Yoshiki Ninomiya; Berthold K. P. Horn; Ichiro Masaki, "A Shape-Independent Method for Pedestrian Detection With Far-Infrared Images," IEEE Transactions on Vehicular Technology, vol. 53, No. 6, pp. 1679-1697, Nov. 2004.

* cited by examiner

FIG. 10

| REGION | DETECTION SIZE (MINIMUM SIZE, MAXIMUM SIZE) (px) |
|---|---|
| REGION(0, 0) | (20, 130) |
| REGION(0, 1) | (20, 130) |
| REGION(0, 2) | (20, 130) |
| | |

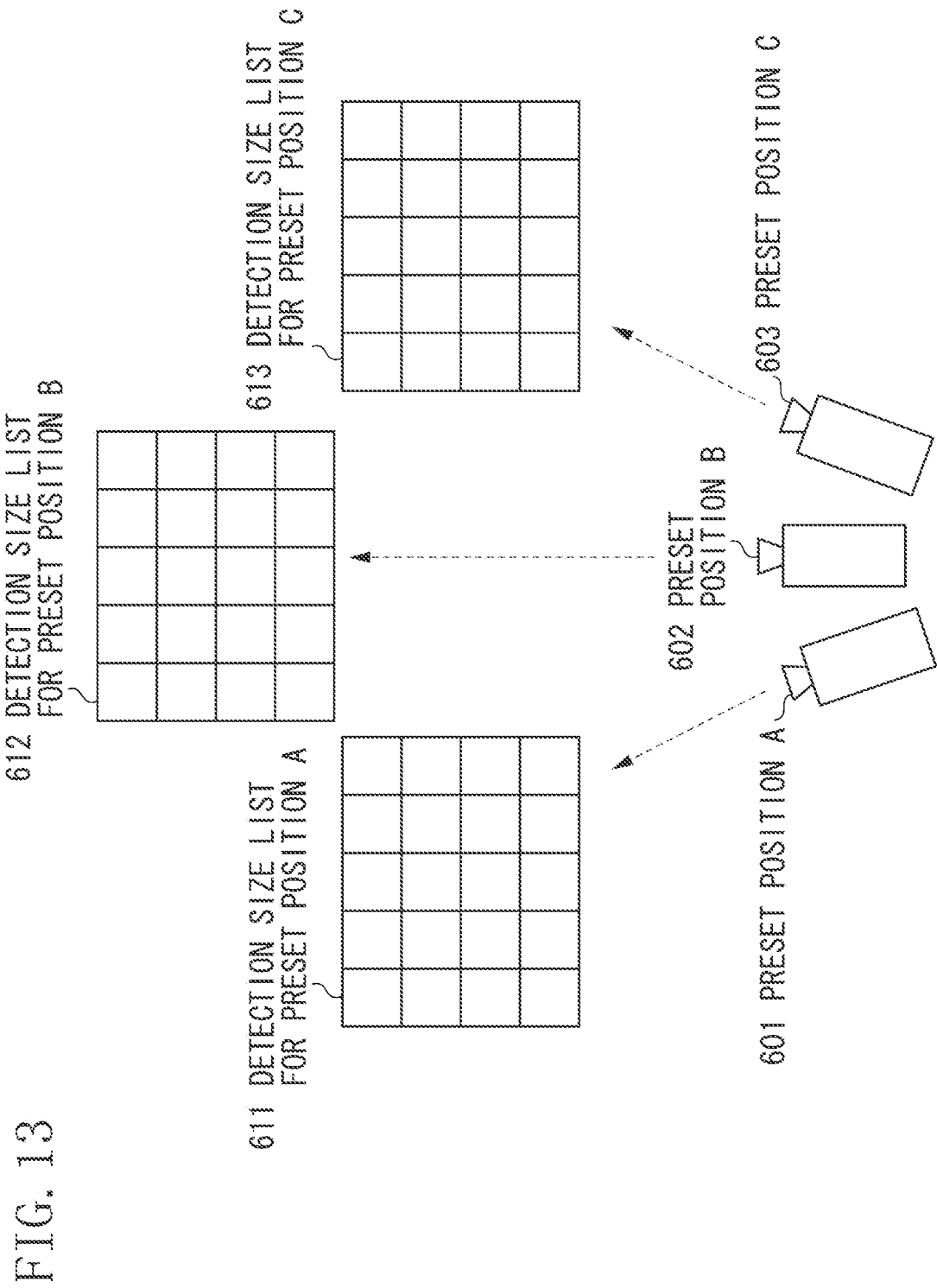

INFORMATION PROCESSING APPARATUS, IMAGE CAPTURING APPARATUS, INFORMATION PROCESSING METHOD, AND RECORDING MEDIUM STORING PROGRAM

BACKGROUND

Field

The present invention relates to an information processing apparatus, an image capturing apparatus, an information processing method, and a recording medium storing a program.

Description of the Related Art

Some digital cameras or digital camcorders automatically detect a subject from a still image or a moving image when capturing these images. Japanese Patent Application Laid-Open No. 2008-289006 discusses a face detection method in digital cameras.

For example, monitoring cameras frequently capture images of objects located at different distances. In such a case, large objects and small objects may exist in an image, leading to misdetection or a longer processing time to detect objects. In addition, with a monitoring camera provided in a space with depth, the size of an object to be detected in an image may be different depending on the region in the image.

SUMMARY

According to an aspect of the present invention, an information processing apparatus includes an acquisition unit configured to acquire a captured image, a first setting unit configured to set a plurality of detection areas of an object for the captured image, a second setting unit configured to set a condition for detecting an object on a first detection area and a second detection area set by the first setting unit, wherein the condition includes a detection size in the captured image, and a detection unit configured to detect an object satisfying the detection size set by the second setting unit from the plurality of detection areas set by the first setting unit.

Further features of the present invention will become apparent from the following description of exemplary embodiments with reference to the attached drawings.

BRIEF DESCRIPTION OF THE DRAWINGS

FIG. 10 is a table illustrating information about a detection size.

FIG. 13 is a schematic diagram illustrating an example of processing performed when an angle of view is changed.

DESCRIPTION OF THE EMBODIMENTS

Hereinafter, an exemplary embodiment of the present invention will be described with reference to the drawings.

In the present exemplary embodiment, processing employed in an information processing system that monitors moving images will be described. The processing includes setting detection areas where human bodies are to be detected in a captured moving image, and setting the sizes (maximum and minimum human body sizes) used for detection for each of the set detection areas to detect human bodies. Using moving images is by way of example and still images may also be used. The minimum human body size is an example of a first detection size. The maximum human body size is an example of a second detection size. Human bodies contained in an image are an example of objects.

Figure 1:
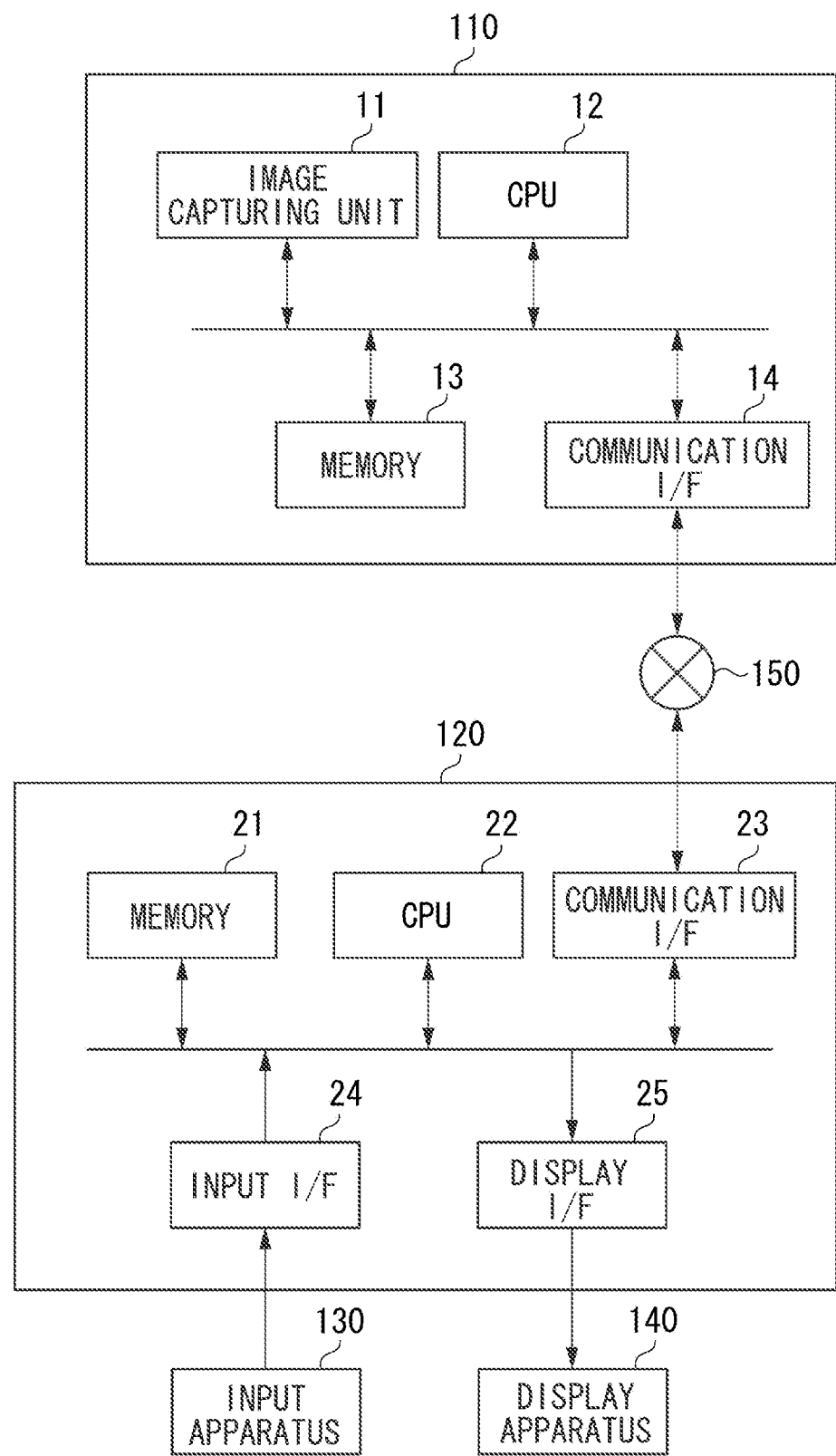
FIG. 1 is a block diagram illustrating an example of a hardware configuration of an information processing system.

An example of the system configuration and the hardware configuration of the information processing system in the present exemplary embodiment is illustrated in FIG. 1. In FIG. 1, an image capturing apparatus 110 captures an image. A client apparatus 120 drives the image capturing apparatus 110 and displays a captured image captured by the image capturing apparatus 110. An input apparatus 130 includes a mouse, a keyboard and the like and allows user input into the client apparatus 120. A display apparatus 140 includes a display and the like and displays an image output by the client apparatus 120. In FIG. 1, the client apparatus 120 and the display apparatus 140 are each illustrated as an independent apparatus, but the client apparatus 120 and the display apparatus 140 may also be configured as an integrated apparatus. Also, the input apparatus 130 and the display apparatus 140 may be configured as an integrated apparatus, or the client apparatus 120, the input apparatus 130, and the display apparatus 140 may be configured as an integrated apparatus. A network 150 connects the image capturing apparatus 110 and the client apparatus 120. The network 150 includes a plurality of routers, switches, cables and the like satisfying communication standards of, for example, a local network. In the present exemplary embodiment, any network capable of performing communication between the image capturing apparatus and the client apparatus may be used regardless of the communication standards, size, and configuration thereof. For example, the network 150 may include the Internet, a wired local area network (LAN), a wireless LAN, or a wide area network (WAN). Also, the number of image capturing apparatuses connected to the client apparatus 120 is not limited to one and a plurality of image capturing apparatuses may be connected thereto. The display apparatus 140 is an example of a display unit. The client apparatus 120 is an example of an information processing apparatus. The image capturing apparatus 110 is, for example, a monitoring camera.

The hardware configuration of the image capturing apparatus 110 will be described. As the hardware configuration, the image capturing apparatus 110 includes an image capturing unit 11, a central processing unit (CPU) 12, a memory 13, and a communication interface (I/F) 14. The image capturing unit 11 has an image sensor and an optical system of subjects on the image sensor, and captures an image on the image sensor using the intersection of the optical axis of the optical system and the image sensor as an image capturing center, based on control of the CPU 12. The image sensor is, for example, a complementary metal-oxide semiconductor (CMOS) sensor or a charge coupled device (CCD) sensor. The CPU 12 controls the entire image capturing apparatus 110. The memory 13 has a random access memory (RAM) or a large-capacity auxiliary storage apparatus that stores programs, images captured by the image capturing unit 11, and data used when the CPU 12 performs processing. The communication I/F 14 controls communication with the client apparatus 120 via the network 150 based on control of the CPU 12. Functions and the like of the image capturing apparatus 110 are implemented by the CPU 12 performing processing based on programs stored in the memory 13.

Next, the hardware configuration of the client apparatus 120 will be described. As the hardware configuration, the client apparatus 120 includes a memory 21, a CPU 22, a communication I/F 23, an input I/F 24, and a display I/F 25. The CPU 22 controls the entire client apparatus 120. The memory 21 stores programs, captured images transmitted from the image capturing apparatus 110, and data used when the CPU 22 performs processing. The communication I/F 23 controls communication with the image capturing apparatus 110 via the network 150 based on control of the CPU 22. The input I/F 24 connects the client apparatus 120 and the input apparatus 130 to control input of information from the input apparatus 130. The display I/F connects the client apparatus 120 and the display apparatus 140 to control output of information to the display apparatus 140. Functions of the client apparatus 120 and processing of the flowchart in FIG. 4 described below are implemented by the CPU 22 performing processing based on programs stored in the memory 21.

Figure 2:
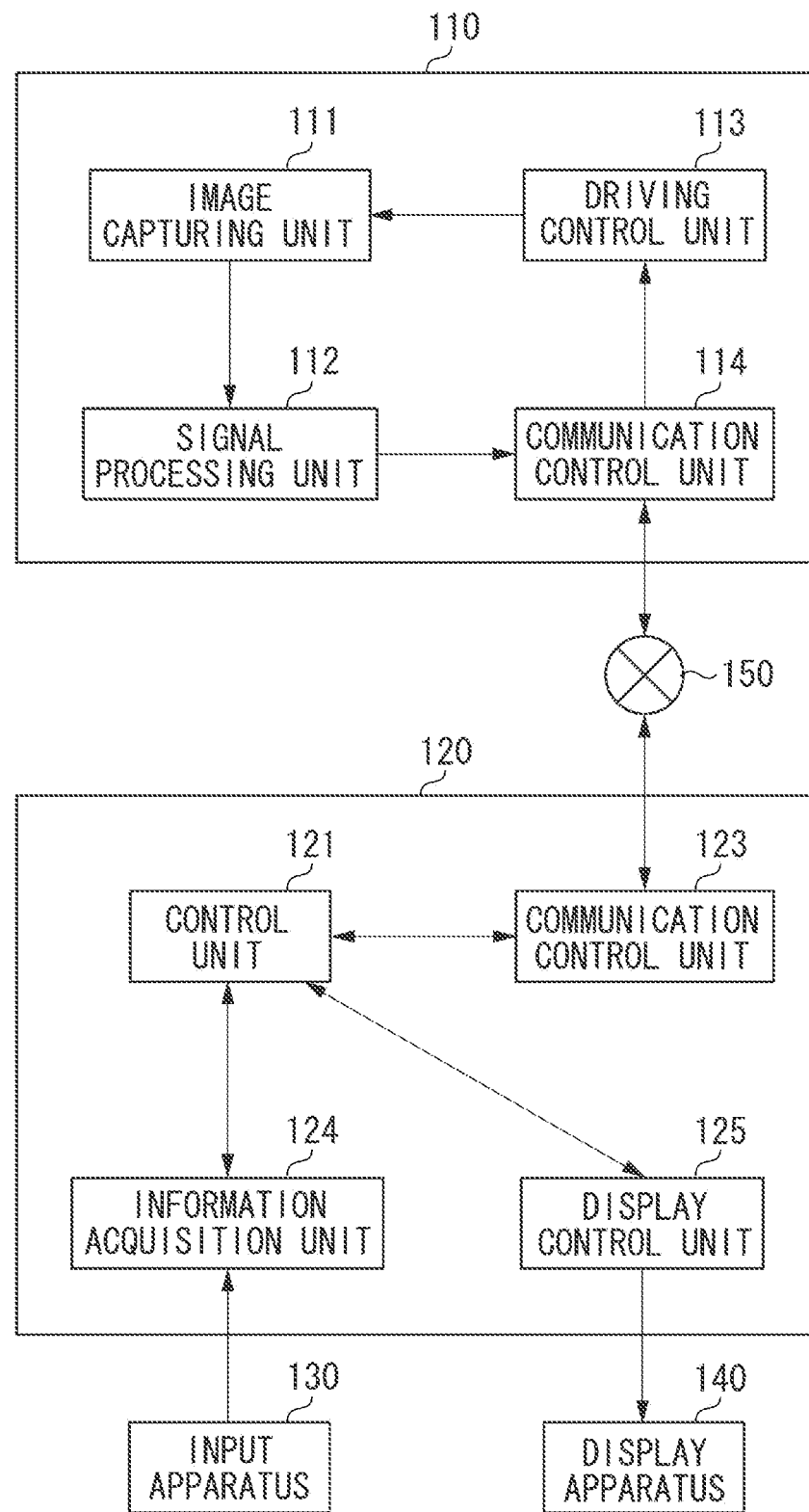
FIG. 2 is a block diagram illustrating an example of a functional configuration of the information processing system.

FIG. 2 is a diagram illustrating an example of the functional configuration of the image capturing apparatus 110 and the client apparatus 120. As the functional configuration, the image capturing apparatus 110 includes a control unit 111, a signal processing unit 112, a driving control unit 113, and a communication control unit 114. The control unit 111 controls the image capturing apparatus 110. The signal processing unit 112 processes an image signal captured by the image capturing unit 11. For example, the signal processing unit 112 encodes an image captured by the image capturing unit 11. As a coding system, the signal processing unit 112 can use, for example, Joint Photographic Experts Group (JPEG). Alternatively, as the coding system, the signal processing unit 112 can use H.264/MPEG-4 AVC (hereinafter, H.264). Alternatively, as the coding system, the signal processing unit 112 can use High Efficiency Video Coding (HEVC). However, the coding system is not limited to the above examples. The signal processing unit 112 may select one of a plurality of coding systems to encode an image. The driving control unit 113 exercises control to change an image capturing direction and an angle of view of the image capturing unit 11. In the present exemplary embodiment, a case where the image capturing unit 11 can change the image capturing direction to a pan direction and a tilt direction and change the image capturing angle of view will be described, but the exemplary embodiment is not limited to such an example. The image capturing apparatus 110 may not have the function to change the image capturing direction to the pan direction and the tilt direction and may not have the function to change the angle of view. The communication control unit 114 transmits, to the client apparatus 120, a captured image processed by the signal processing unit 112. Further, the communication control unit 114 receives, from the client apparatus 120, control commands for the image capturing apparatus 110.

As the functional configuration, the client apparatus 120 includes a control unit 121, a communication control unit 123, an information acquisition unit 124, and a display control unit 125. The control unit 121 controls the client apparatus 120. The communication control unit 123 receives a captured image from the image capturing apparatus 110. The information acquisition unit 124 accepts user input by the input apparatus 130 to acquire input information from the input apparatus 130. The display control unit 125 outputs video to the display apparatus 140 and causes the display apparatus 140 to perform display processing described below.

In the present exemplary embodiment, the client apparatus 120 sets detection areas where human bodies are to be detected on a captured image received from the image capturing apparatus 110 and sets the maximum and minimum human body sizes for each set detection area to perform human body detection processing. Accordingly, the human body detection processing can be performed on real-time live video by setting detection areas where human bodies are to be detected and setting the maximum and minimum human body sizes for each set detection area. However, the exemplary embodiment is not limited to such an example. For example, the client apparatus 120 may perform the human body detection processing by acquiring moving images stored in the image capturing apparatus 110, setting detection areas where human bodies are to be detected to each frame, and setting the maximum and minimum human body sizes for each set detection area. Also, the client apparatus 120 may perform the human body detection processing by setting detection areas where human bodies are to be detected to each frame of moving images stored in the client apparatus 120 and setting the maximum and minimum human body sizes for each set detection area. Alternatively, the client apparatus 120 may perform the human body detection processing by accessing a recording server, setting detection areas where human bodies are to be detected to each frame of moving images stored on the recording server, and setting the maximum and minimum human body sizes for each set detection area.

Next, the configuration and the flow of processing for setting detection areas where human bodies are to be detected and setting the maximum and minimum human body sizes for each set detection area in the present exemplary embodiment will be described with reference to FIGS. 3 to 7.

Figure 3:
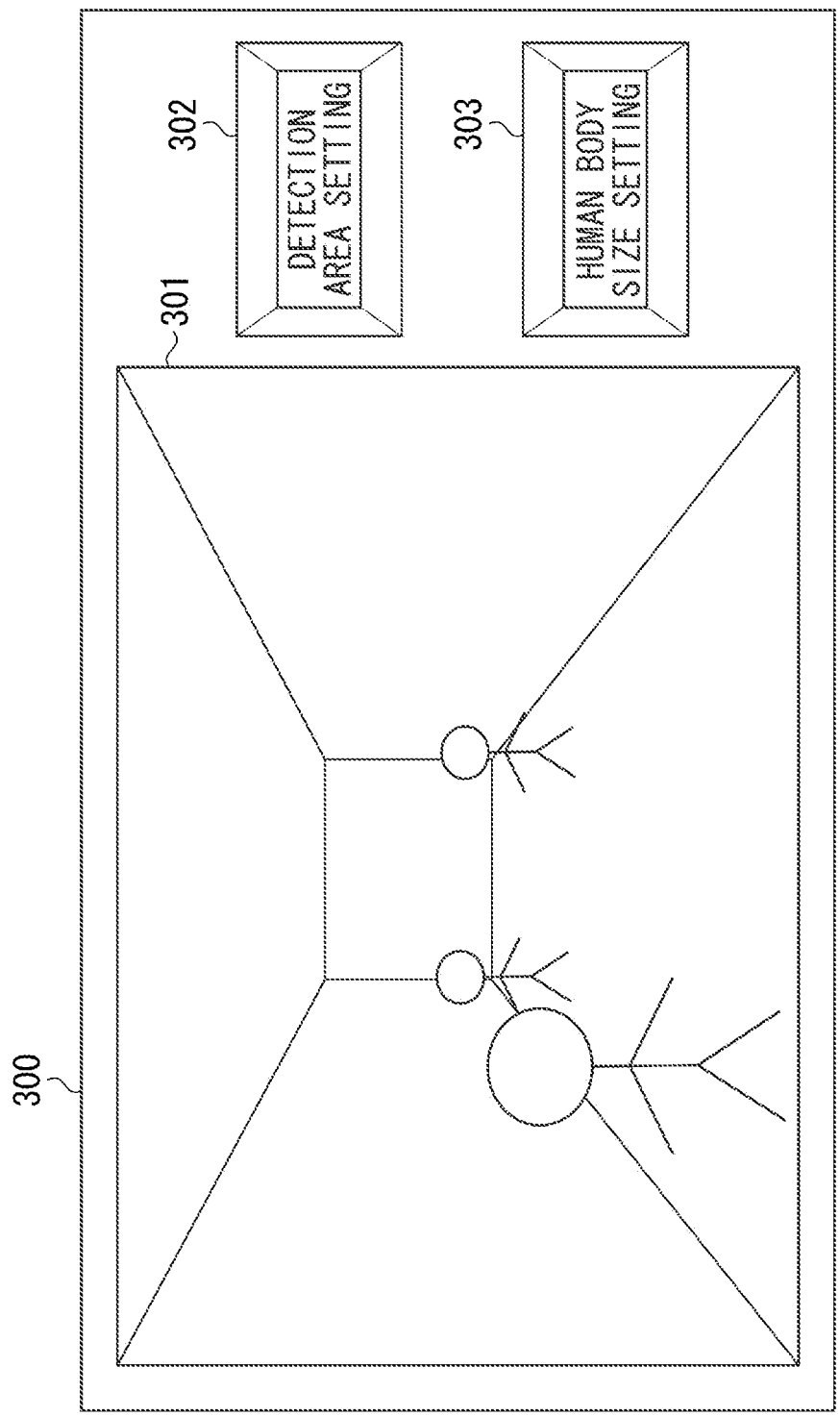
FIG. 3 is a schematic diagram illustrating an example of a screen.

FIG. 3 is a diagram illustrating an example in which detection areas where human bodies are to be detected are set and the maximum and minimum human body sizes are set for each set detection area. In FIG. 3, a screen 300 is a graphical user interface to prompt the user to set detection areas. An image 301 is a captured image 301 acquired by the control unit 121 from the image capturing apparatus 110. A button 302 is a button to set detection areas. A button 303 is a button to set the maximum and minimum human body sizes for each detection area. The screen 300 in FIG. 3 is displayed to the user by the display apparatus 140. In the present exemplary embodiment, a graphical user interface is used to prompt the user to make settings, but other methods such as voice may also be used to prompt the user to make the settings.

Figure 4:
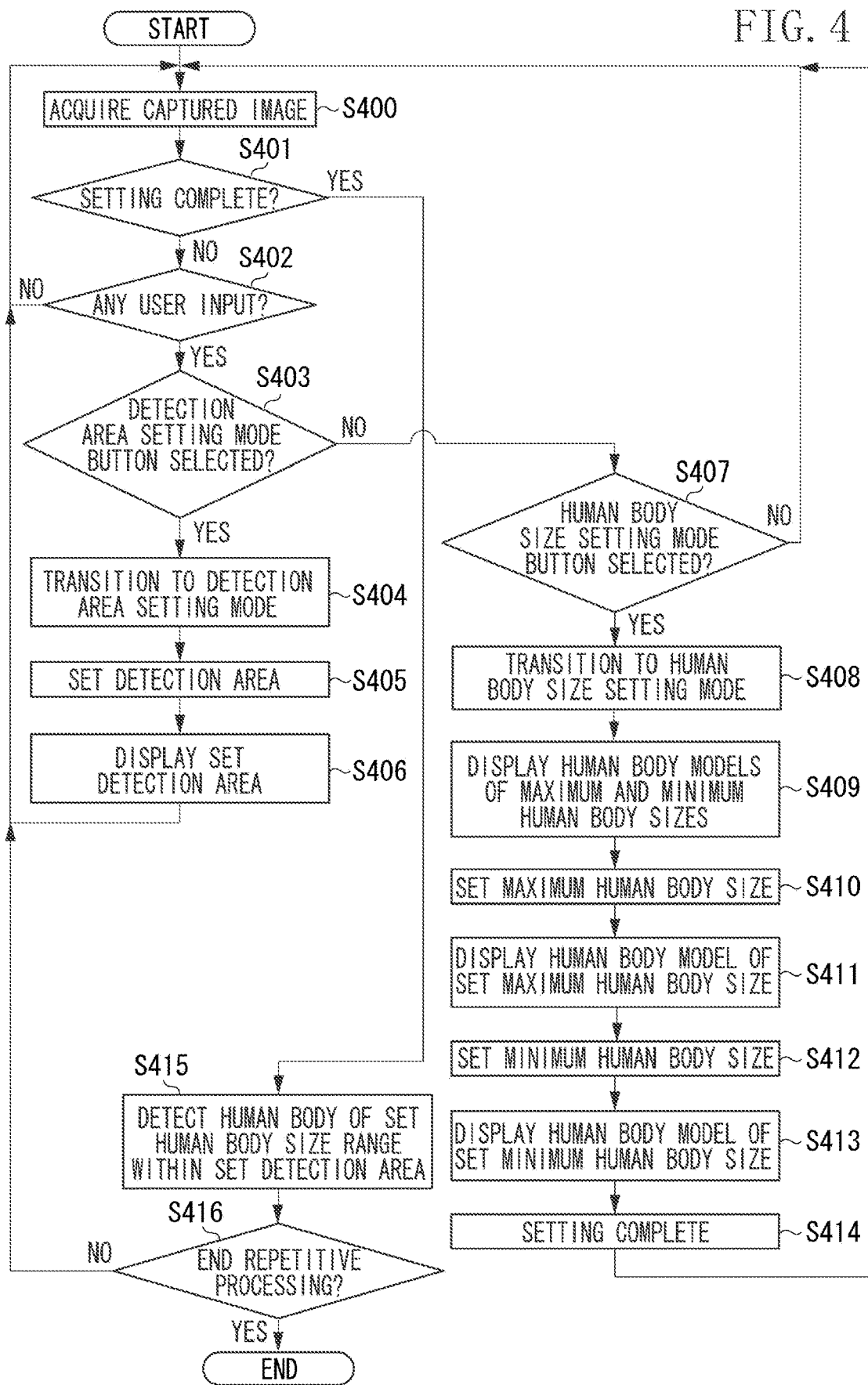
FIG. 4 is a flowchart illustrating processing of detection settings.

FIG. 4 is a flowchart illustrating information processing in which detection areas where human bodies are to be detected are set and the maximum and minimum human body sizes are set for each set detection area.

In step S400, the control unit 121 acquires a captured image from the image capturing apparatus 110. The processing in step S401 is an example of acceptance processing for accepting an image.

In step S401, the control unit 121 determines whether detection areas and the maximum and minimum human body sizes for each detection area are in a setting complete state based on descriptions or the like of a setting file stored in the memory 21. If the detection areas and the maximum and minimum human body sizes are determined to be in a setting complete state (YES in step S401), the processing proceeds to step S415 and if the detection areas and the maximum and minimum human body sizes are determined not to be in a setting complete state (NO in step S401), the processing proceeds to step S402.

In step S402, the control unit 121 determines whether user input has occurred via the input apparatus 130. If it is determined that the user input has occurred (YES in step S402), the processing proceeds to step S403 and if it is determined that the user input has not occurred (NO in step S402), the processing returns to step S400.

In step S403, the control unit 121 determines whether the button 302 has been selected. If it is determined that the button 302 has been selected (YES in step S403), the processing proceeds to step S404 and if it is determined that the button 302 has not been selected (NO in step S403), the processing proceeds to step S407.

Figure 5:
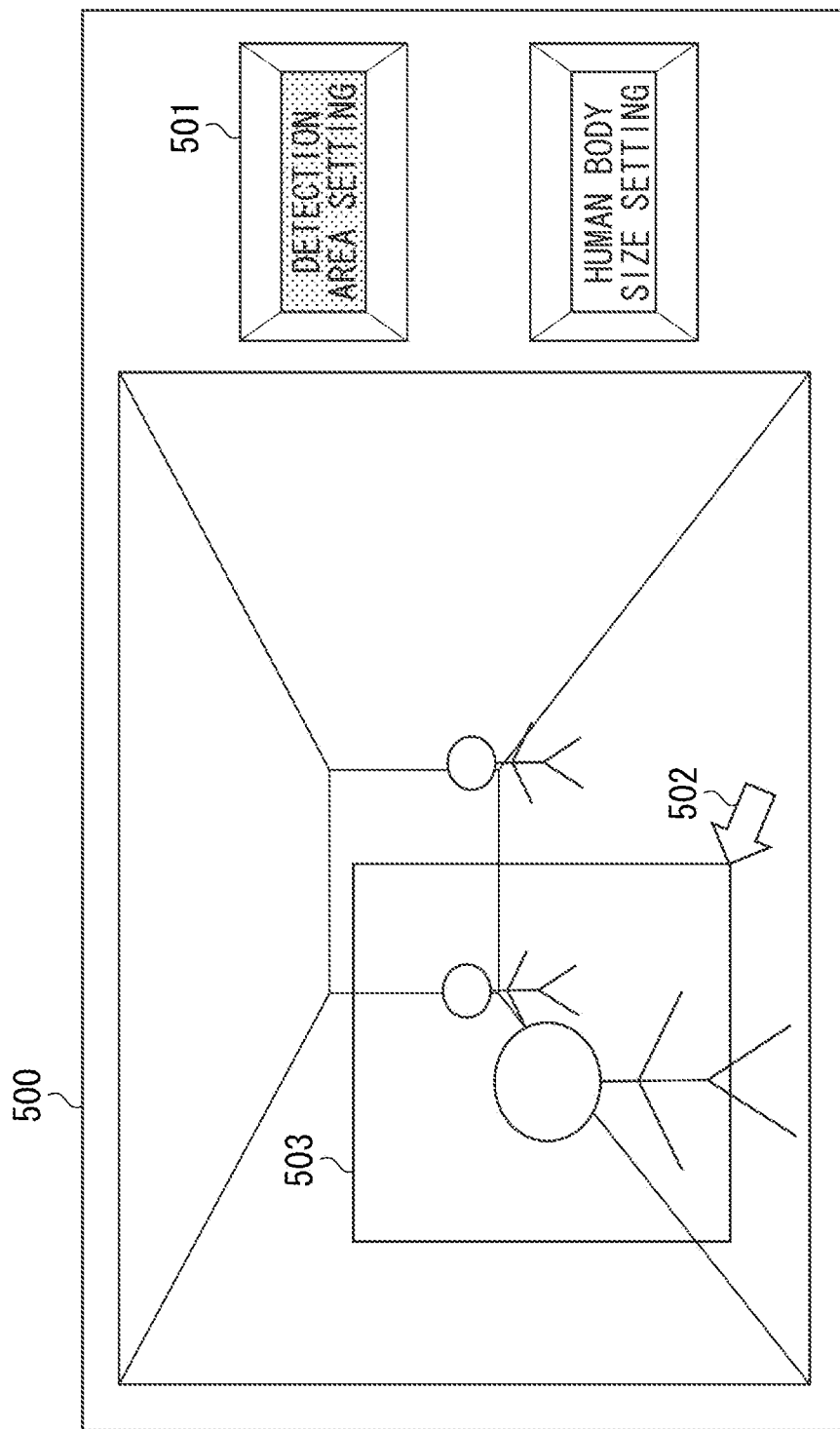
FIG. 5 is a schematic diagram illustrating an example of setting a detection area.

In step S404, the control unit 121 transitions to a detection area setting mode and exercises control so that the display apparatus 140 is caused to display the screen illustrated in FIG. 5. A plurality of detection areas can be set.

FIG. 5 is a diagram illustrating an example of the screen for setting the detection area after transitioning to the detection area setting mode. A screen 500 is a screen for setting detection areas where human bodies are to be detected after transitioning to the detection area setting mode. The screen 500 indicates a diagram illustrating an example of an area setting screen. A button 501 indicates the transition to the detection area setting mode and the display of this button has changed from that of the button 302. A cursor 502 is a cursor of the input apparatus 130 to set detection areas. A detection area 503 is a rectangle indicating a set detection area. In the present exemplary embodiment, the detection area 503 is set as a rectangle, but may also be set as a different shape. The button 501 is an example of identification information that can identify the screen displayed by the display apparatus 140 as an area setting screen.

In step S405, the control unit 121 accepts a setting operation of the detection area 503 by the user via the input apparatus 130 and the screen 500 displayed in the display apparatus 140 to set the detection area 503. The detection area 503 is an area (range) having a predetermined size set for an image.

In step S406, the control unit 121 causes the display apparatus 140 to display the detection area 503 set in step S405 as illustrated in FIG. 5.

In step S407, the control unit 121 determines whether the button 303 has been selected. If it is determined that the button 303 has been selected (YES in step S407), the processing proceeds to step S408 and if it is determined that the button 303 has not been selected (NO in step S407), the processing returns to step S400.

Figure 6:
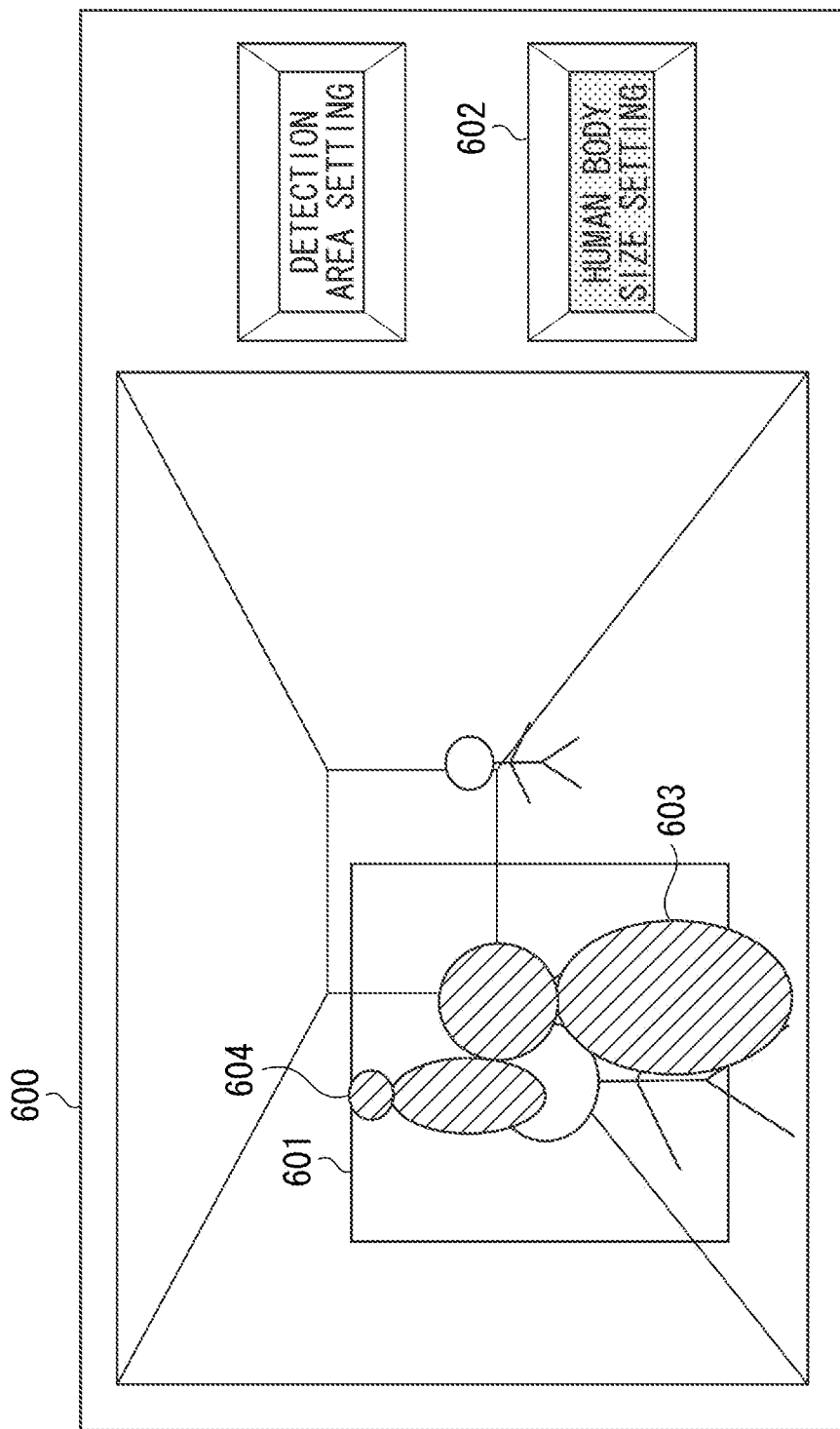
FIG. 6 is a schematic diagram illustrating an example of setting a human body size.

In step S408, the control unit 121 transitions to a human body size setting mode and exercises control so that the display apparatus 140 is caused to display the screen illustrated in FIG. 6.

FIG. 6 is a diagram illustrating an example of the screen for setting the human body size after transitioning to the human body size setting mode. A screen 600 indicates a diagram illustrating an example of a size setting screen. A detection area 601 is the detection area 503 set in step S405 and is also an area where the maximum and minimum human body sizes are set by the user. A button 602 indicates the transition to the human body size setting mode and the display of this button has changed from that of the button 303. A human body model 603 is a human body model to set the maximum human body size in the detection area 601. A human body model 604 is a human body model to set the minimum human body size in the detection area 601. In the present exemplary embodiment, the human body model 603 and the human body model 604 are displayed in a shape close to a human body shape, but may also be displayed in other shapes. The button 602 is an example of identification information for identifying that the screen displayed by the display apparatus 140 is a size setting screen.

In step S409, the control unit 121 exercises control so that the display apparatus 140 is caused to display the human body model 603 and the human body model 604. In the present exemplary embodiment, the control unit 121 displays the human body model 603 and the human body model 604 after transitioning to the human body size setting mode, but this does not limit the present exemplary embodiment. The control unit 121 may display the human body model 603 and the human body model 604 in the detection area setting mode, or control the display state of the human body model 603 and the human body model 604 by other methods such as displaying translucently until the control unit 121 transitions to the human body size setting mode. The human body model 604 is an example of objects for setting the first detection size. The human body model 603 is an example of objects for setting the second detection size. The control unit 121 causes the display apparatus 140 to display the human body model 603 toward the front than the human body model 604 in the screen 600 or at a lower portion of the screen 600. This is because in a deep wide-range captured image, a relatively large subject exists at the front and a smaller subject exists at the back.

In step S410, the control unit 121 accepts a drag operation or the like of the human body model 603 by the user via the input apparatus 130 in the screen 600 displayed in the display apparatus 140 to change the maximum human body size. Here, the maximum human body size is the maximum detection size of human body with respect to the screen. In the present exemplary embodiment, the maximum human body size in the detection area 601 is changed by dragging the human body model 603, but may also be changed by other methods.

Figure 7:
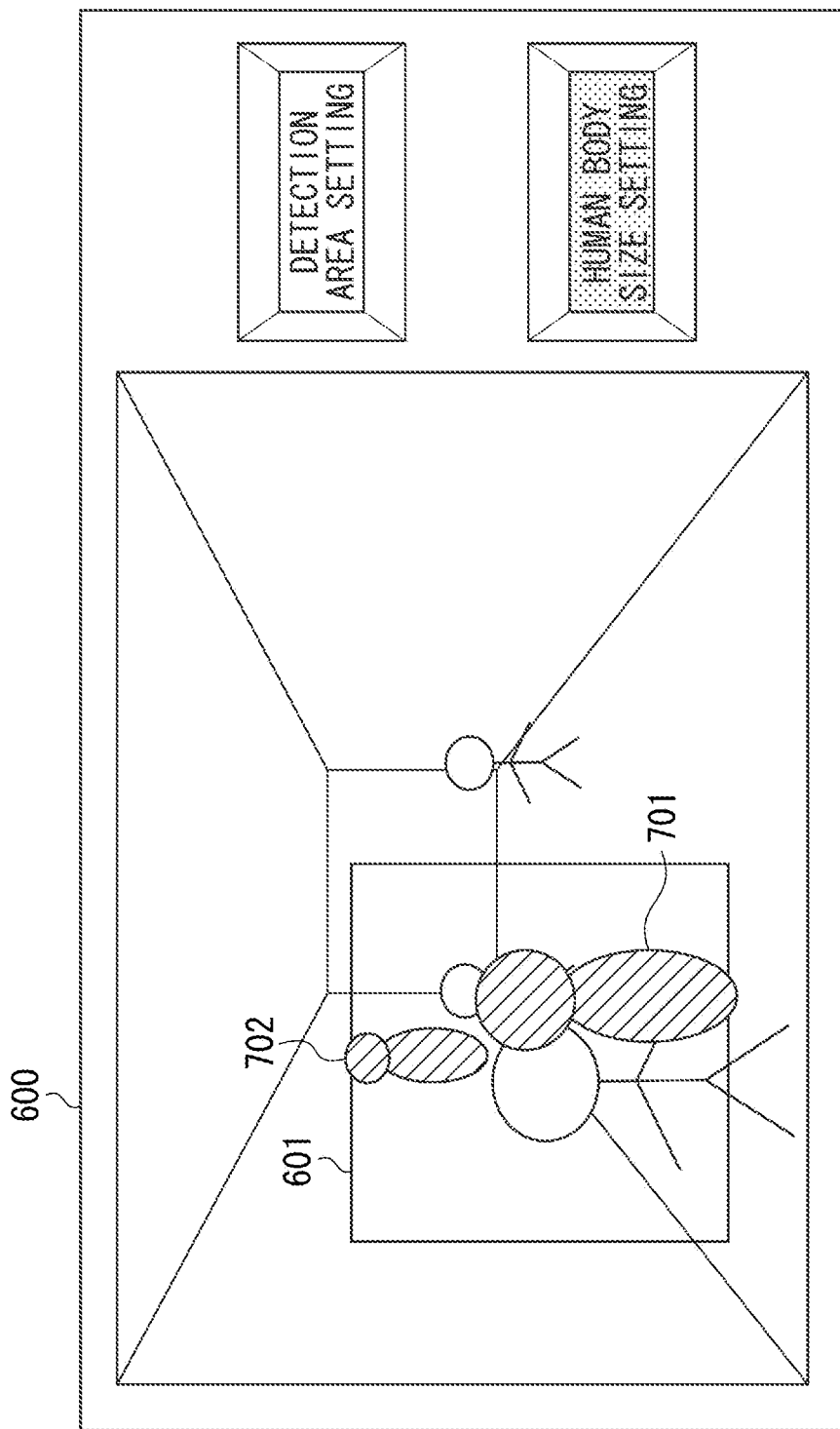
FIG. 7 is a schematic diagram illustrating an example of changing the human body size.

In step S411, the control unit 121 causes the screen 600 to display a human body model 701 of the maximum human body size changed in step S410 as illustrated in FIG. 7 described below.

In step S412, the control unit 121 accepts a drag operation or the like of the human body model 604 by the user via the input apparatus 130 in the screen 600 displayed in the display apparatus 140 to change the minimum human body size. Here, the minimum human body size is the minimum detection size of human body with respect to the screen. In the present exemplary embodiment, the minimum human body size in the detection area 601 is changed by dragging the human body model 604, but may also be changed by other methods.

In step S413, the control unit 121 causes the screen 600 to display a human body model 702 of the minimum human body size changed in step S412 as illustrated in FIG. 7 described below.

FIG. 7 is a diagram illustrating an example of the changed maximum and minimum human body sizes. The human body model 701 is a human body model of the maximum human body size in the detection area 601 after the size of the model is changed. The human body model 702 is a human body model of the minimum human body size in the detection area 601 after the size of the model is changed. The processing in steps S410 and S411 and that in steps S412 and S413 may be performed in reverse order.

In step S414, the control unit 121 describes and stores a setting complete state in, for example, the setting file of the memory 21. An example in which the human body size is set for one detection area 503 has been described to simplify the description, but processing in steps S408 to S414 may similarly be performed for a plurality of detection areas 503.

In step S415, the control unit 121 detects a human body in the detection area set in step S405 between the minimum human body size in the detection area set in step S412 and the maximum human body size in the detection area set in step S410. As a human body detection method, the technique discussed in Japanese Patent Application Laid-Open No. 2014-199506 can be used, for example. The control unit 121 may also set the maximum human body size and the minimum human body size for each set detection area and detect human bodies of the set human body sizes in the set detection areas.

The control unit 121 may transmit information about the detected human bodies, the number of detected human bodies and the like to an external apparatus via the communication control unit 123 or cause the display apparatus 140 to display such data.

In step S416, the control unit 121 determines whether to end repetitive processing. If it is determined to end the repetitive processing (YES in step S416), the control unit 121 ends the processing of the flowchart illustrated in FIG. 4 and if it is determined not to end the repetitive processing (NO in step S416), the processing returns to step S400.

Next, an example in which the size of a person to be detected is set or updated for each region of an image will be described.

Figure 8:
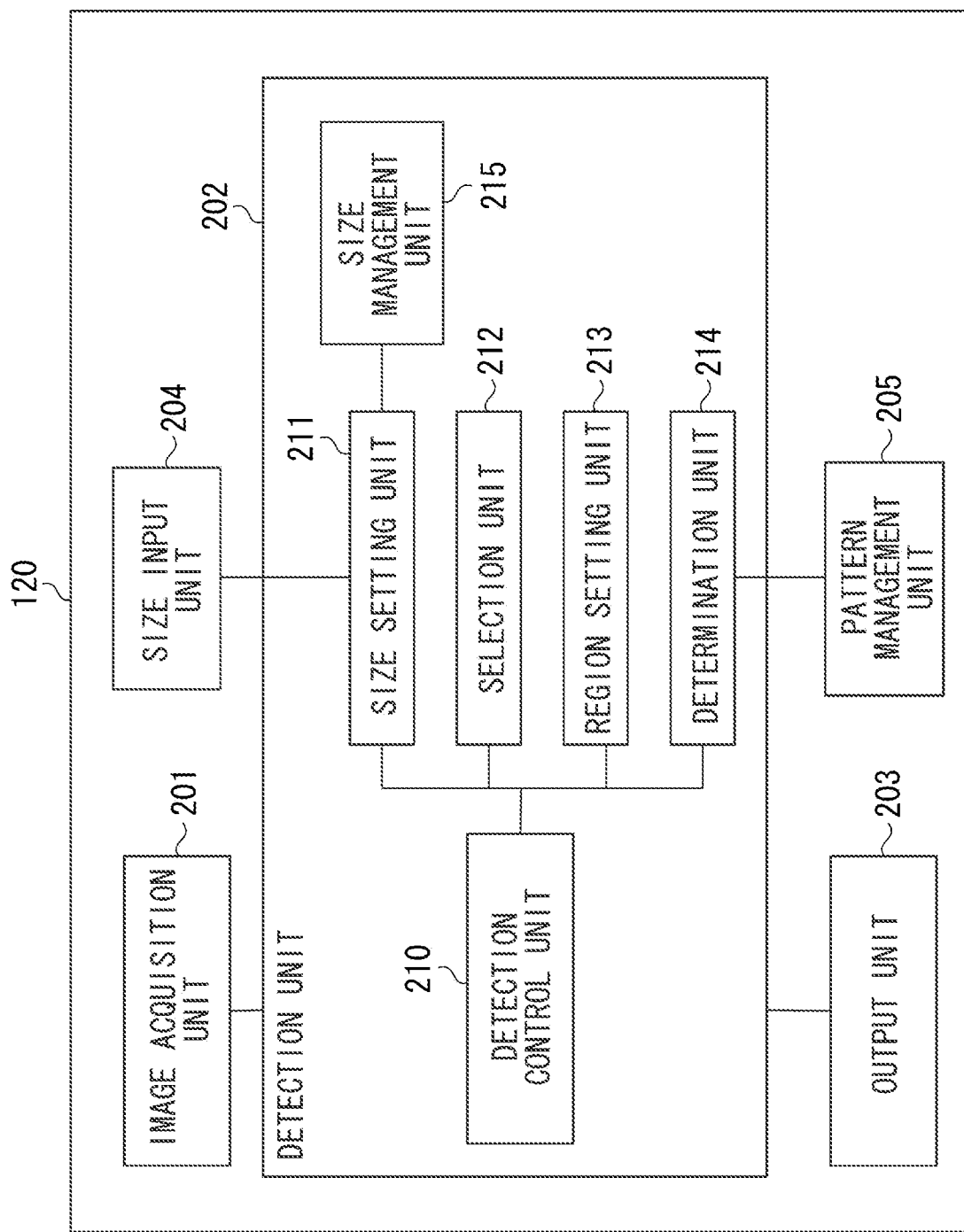
FIG. 8 is a block diagram illustrating an example of a functional configuration of an image processing apparatus.

FIG. 8 is a diagram illustrating an example of the functional configuration of an image processing apparatus 120. The image processing apparatus 120 includes an image acquisition unit 201, a detection unit 202, an output unit 203, a size input unit 204, and a pattern management unit 205. The image acquisition unit 201 acquires an image (a moving image or a still image) acquired from the image capturing apparatus 110 and transmits the acquired image to the detection unit 202. The image acquisition unit 201 may also acquire an image from an external image capturing apparatus or a server apparatus that supplies images, for example. Also, the image acquisition unit 201 may acquire an image stored in the memory 21 inside the image processing apparatus 120. The image acquired by the image acquisition unit 201 is an example of a detection processing target image to be input into the image processing apparatus 120.

If a moving image is acquired as an image, the image acquisition unit 201 sequentially transmits each frame image constituting the acquired moving image to the detection unit 202. Then, the detection unit 202 performs object detection processing for each transmitted frame. If a still image is acquired as an image, the image acquisition unit 201 transmits the acquired still image to the detection unit 202. Hereinafter, a case where a still image or one frame in a moving image is transmitted from the image acquisition unit 201 to the detection unit 202 will be described.

The detection unit 202 includes a detection control unit 210, a size setting unit 211, a selection unit 212, a region setting unit 213, a determination unit 214, and a size management unit 215.

The detection control unit 210 mainly exercises control of each element in the object detection processing.

Figure 9:
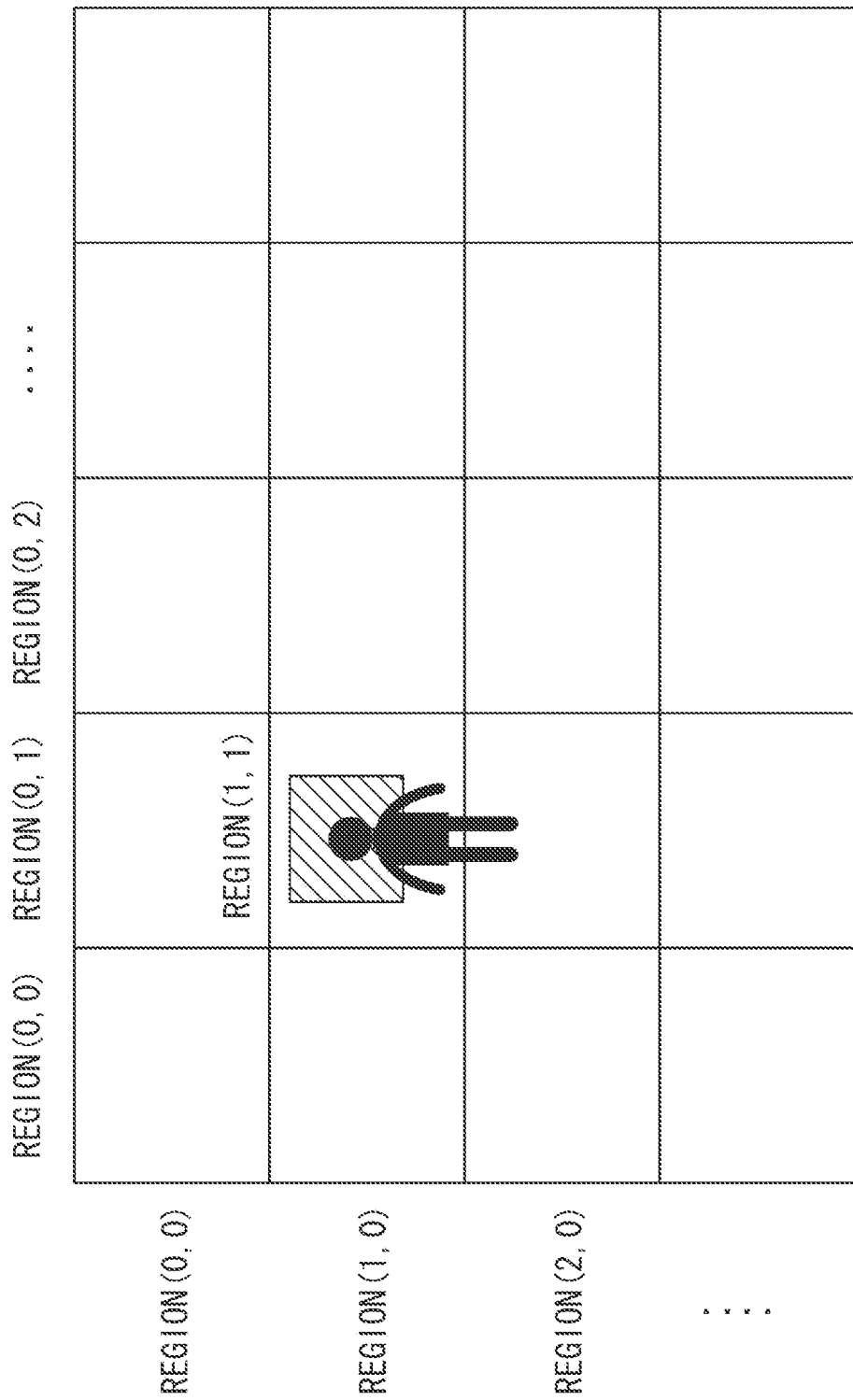
FIG. 9 is a schematic diagram illustrating regions contained in an image.

FIG. 9 is a diagram illustrating an example of regions contained in an image. In the example of FIG. 9, a state in which an image transmitted from the image acquisition unit 201 is divided into a plurality of regions of the same size is illustrated. The size setting unit 211 sets a plurality of regions where objects are to be detected by detection processing with a preset method in the image transmitted from the image acquisition unit 201. The size setting unit 211 sets each region obtained by, for example, dividing the image transmitted from the image acquisition unit 201 into N equal portions vertically and horizontally, as a region where objects are to be detected by detection processing. A detection processing target region set inside an image transmitted from the image acquisition unit 201 is an example of a region set for an image.

The size setting unit 211 sets, for each region (for example, each region in FIG. 9) set inside the image transmitted from the image acquisition unit 201, the range of size of objects to be detected in the region and instructs the size management unit 215 to store information about the set size. Hereinafter, the size of objects to be detected in each region will be called the detection size. The detection unit 202 performs processing for detecting an object of the size indicated by information about the detection size for each region in the image. The size management unit 215 stores the information about the detection size set by the size setting unit 211 in the memory 21 and manages the information.

FIG. 10 is a diagram illustrating an example of information about the detection size managed by the size management unit 215. The table in FIG. 10 contains an item for the region indicating each region in an image and an item for the detection size. In the example of FIG. 10, information about the detection size is given as a pair of the minimum size and the maximum size and indicates that objects of the size equal to or more than the minimum size and equal to or less than the maximum size are to be detected. Also in the example of FIG. 10, the minimum size and the maximum size indicate the length of one side of a rectangular region containing a detected object.

The size input unit 204 accepts the designation of the detection size for each region in the image based on, for example, a user's operation via an operation unit of the image processing apparatus 120. The size input unit 204 may also accept the designation of the detection size for each region in the image by receiving information about the detection size for each region in the image from an external information processing apparatus via, for example, the network I/F 105.

In the example of FIG. 10, information about the detection size managed by the size management unit 215 contains information about the detection size, but may further contain other information such as the number of times of performing the detection processing and the average size of detected objects.

Next, an overview of the object detection processing by the detection unit 202 will be provided. In the present exemplary embodiment, the detection unit 202 performs the object detection processing as described below. First, the detection unit 202 arranges an identification pattern on an upper left corner of the object detection processing target image. In the present exemplary embodiment, the position of the identification pattern in the object detection processing target image is the position of the pixel on the upper left corner of the identification pattern in the image. That is, the detection unit 202 arranges the identification pattern such that the upper left corner of the object detection processing target image and the upper left corner of the identification pattern overlap. The identification pattern is an image used for pattern matching of the object detection processing. The pattern matching is processing for determining whether a specific pattern and the pattern to be compared match or are similar to each other. The processing of pattern matching includes, for example, processing in which a difference between pixels of the identification pattern and pixels of the detection processing target image overlapping with the pixels of the identification pattern is summed up for all pixels of the identification pattern and the value of the summed difference is used for a threshold determination. In that case, for example, if the value of the summed difference is equal to or less than a set threshold, the detection unit 202 determines that the portion overlapping the identification pattern in the detection processing target image is an object indicated by the identification pattern. If, for example, the value of the summed difference is larger than the set threshold, the detection unit 202 determines that the portion overlapping the identification pattern in the detection processing target image is not an object indicated by the identification pattern.

As the processing of pattern matching, for example, the following processing is also known. It is the processing in which feature amounts are extracted from each of the identification pattern and the detection processing target image overlapping the identification pattern, and the value of difference between the extracted feature amounts is used for the threshold determination. Characteristic quantities extracted include a Haar-like feature amount, a histogram of oriented gradients (HOG) feature amount, and a scale-invariant feature transform (SIFT) feature amount.

Hereinafter, the object detection processing in the present exemplary embodiment will be described more specifically.

The detection control unit 210 transmits the image (hereinafter, the first image) transmitted from the image acquisition unit 201 to the selection unit 212.

The selection unit 212 generates a plurality of images having different resolutions by reducing the first image to detect objects of different sizes from the first image transmitted from the detection control unit 210.

Here, the reason for generating the plurality of images obtained by reducing the first image will be described. In the present exemplary embodiment, the detection unit 202 determines whether the overlapping portion between the identification pattern and the first image as a detection processing target image is an object indicated by the identification pattern by performing pattern matching on the overlapping portion. However, only an object having the same size as the identification pattern can be detected by pattern matching with the identification pattern. In the present exemplary embodiment, it is necessary for the detection unit 202 to detect objects of various sizes from the first image. Thus, the detection unit 202 generates an image by reducing the first image and performs similar pattern matching of the generated image with the identification pattern so that objects of various sizes can be detected. If, for example, the identification pattern has a square shape of 20 pixels on one side, the detection unit 202 can detect objects of 20 pixels from the first image and objects of 40 pixels from an image obtained by reducing the first image to half the original size. That is, the selection unit 212 generates reduced images of the first image in accordance with the size of objects to be detected.

The selection unit 212 generates reduced images of the first image. At this point, the selection unit 212 determines the number of reduced images so that objects can be detected within the range of the detection size set by the size setting unit 211 and obtains a group of images to be detected. It is assumed that, for example, the minimum detection size is 20 pixels and the maximum detection size is 130 pixels for each region present in the upper half of the first image. It is also assumed that the minimum detection size is 100 pixels and the maximum detection size is 150 pixels for each region present in the lower half of the first image. In that case, the selection unit 212 generates reduced images of the first image in multiple stages so that objects of sizes from, for example, 20 pixels to 150 pixels can be detected. If, for example, objects smaller than the size of the identification pattern is to be detected, the selection unit 212 may generate enlarged images of the first image. In that case, the detection unit 202 performs the object detection processing on enlarged images of the first image using the identification pattern.

Figure 11:
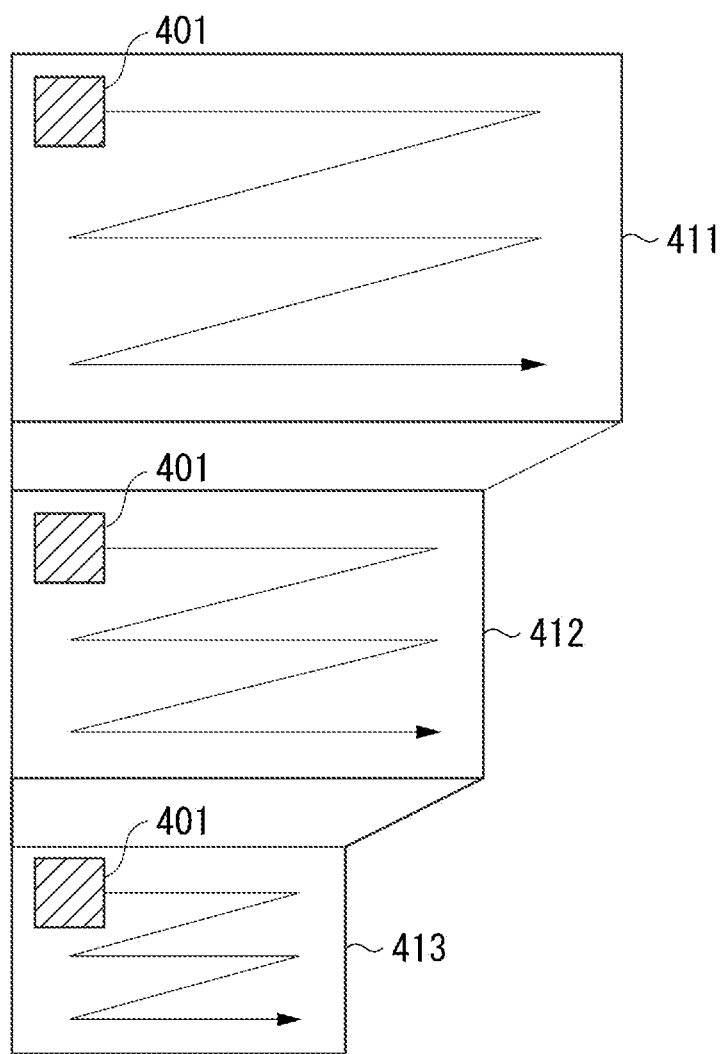
FIG. 11 illustrates an example of object detection processing.

FIG. 11 is a diagram illustrating examples of the first image and reduced images of the first image. An image 411 is the first image, and an image 412 and an image 413 are reduced images of the first image. An identification pattern 401 is a pattern used for the object detection processing in the present exemplary embodiment and an image illustrating a human body as an object to be detected.

Next, the detection unit 202 performs the object detection processing using the identification pattern 401 on the first image and reduced images of the first image generated by the selection unit 212. The selection unit 212 selects a detection processing target image, one by one, from the first image and reduced images and transmits the selected image to the region setting unit 213. Here, the processing performed when the selection unit 212 selects the image 411 will be described. The determination unit 214 acquires information about the identification pattern 401 from, for example, an auxiliary storage apparatus 103 via the pattern management unit 205 and transmits the information to the region setting unit 213.

The region setting unit 213 arranges the identification pattern 401 in a preset initial position and moves the identification pattern 401 by a preset movement method. The region setting unit 213 arranges the identification pattern 401 on the upper left corner of the image 411. The region setting unit 213 sequentially moves the identification pattern 401 from left to right, from top to bottom. For example, the region setting unit 213 moves the identification pattern 401 from left to right by set pixels (for example, by one pixel, by five pixels and so on) until the right corner of the identification pattern 401 overlaps that of the image 411. Next, the region setting unit 213 moves the identification pattern 401 to the left corner and then downward by set pixels (for example, by one pixel, by five pixels and so on). Then, the region setting unit 213 moves the identification pattern 401 from left to right by set pixels again until the right corner of the identification pattern 401 overlaps that of the image 411. The region setting unit 213 repeats the above processing until the lower right corner of the identification pattern 401 overlaps the lower right corner of the image 411.

In the present exemplary embodiment, a plurality of regions is set inside the first image and the size of objects to be detected is set for each region. Then, the following processing is performed by the determination unit 214 each time the identification pattern 401 is moved by the region setting unit 213. The determination unit 214 identifies to which region of the image 411 the position of the identification pattern 401 (the position of the pixel on the upper left corner) belongs. Then, the determination unit 214 determines whether the size of objects corresponding to the image (the image 411) on which the detection processing is currently being performed is contained in the range indicated by the detection size corresponding to the identified region. If it is determined that the size is contained in the range, the determination unit 214 performs the object detection processing by performing pattern matching between the identification pattern 401 at the current position and the region of the image 411 overlapping the identification pattern 401 at the current position. If it is determined that the size is not contained in the range, the determination unit 214 does not perform the object detection processing by pattern matching between the identification pattern 401 at the current position and the region of the image 411 overlapping the identification pattern 401 at the current position. Accordingly, the image processing apparatus 120 can reduce processing load by not performing the object detection processing on objects with sizes other than the detection size, thereby speeding up the processing.

When an object is detected by the determination unit 214, the detection control unit 210 outputs position information about the identification pattern 401 and size information about the detected object to the size setting unit 211. The size setting unit 211 updates the detection size of the region in which the identification pattern 401 is contained based on the position information of the identification pattern 401 and the size information of the detected object output from the detection control unit 210. In the present exemplary embodiment, it is assumed that the identification pattern 401 is contained in the region in which the identification pattern 401 is positioned (the region in which the pixel on the upper left corner of the identification pattern 401 is present).

The detection unit 202 similarly performs the object detection processing on reduced images of the first image such as the image 412 and the image 413. The detection unit 202 updates the detection size after converting position information and size information indicated by detection results of objects from the reduced images of the first image to the position information and size information in the first image.

Next, update processing of the detection size by the size setting unit 211 will be described. A case where, as illustrated in FIG. 10, a new object is detected by the determination unit 214 while the size management unit 215 manages information about the detection size for each region will be described. Position information and size information of the object detected by the determination unit 214 are input into the size setting unit 211. Then, the size setting unit 211 updates the detection size based on Formula 1 and Formula 2 below:

$$HBSmin=(HBS\_new+HBSmin\_old)*\gamma/2 \quad \text{(Formula 1)}$$

$$HBSmax=(HBS\_new+HBSmax\_old)*\gamma/2 \quad \text{(Formula 2)}$$

In Formula 1 and Formula 2, HBSmin represents the minimum size of the updated detection size. HBSmax represents the maximum size of the updated detection size. HBS_new represents the size of the detected object. HBSmin_old represents the minimum size of the detection size before being updated. HBSmax_old represents the maximum size of the detection size before being updated. $\gamma$ represents a size coefficient for adjusting the updated detection size and takes any value. The size setting unit 211 may change the value of $\gamma$ when appropriate.

The size setting unit 211 can reflect results of sizes of objects detected in the past in the detection size as statistic information by updating the detection size using Formula 1 and Formula 2. After the detection size is updated, the detection unit 202 can omit detection processing for objects with unnecessary sizes by detecting objects within the range (HBSmin to HBSmax) of the updated detection size in consideration of detection results in the past.

In the foregoing, the processing of the detection unit 202 performed when an image as a still image is transmitted from the image acquisition unit 201 has been described. When an image as a moving image is transmitted from the image acquisition unit 201, the detection unit 202 repeatedly performs the processing described in the present exemplary embodiment on each frame contained in the moving image.

The output unit 203 outputs information indicating processing results obtained by the detection unit 202. The output unit 203 outputs the information indicating processing results to, for example, the display unit of the image processing apparatus 120, or the display unit of an external apparatus connected to the image processing apparatus 120 wirelessly or by wire. The output unit 203 may also output the information to, for example, a display apparatus such as an external display connected to the image processing apparatus 120 wirelessly or by wire. The output unit 203 may also output the information indicating processing results obtained by the detection unit 202 as it is, or as visible graphics. The information indicating processing results obtained by the detection unit 202 is, for example, information indicating the position and size of a detected object, and information indicating the detection size of each region updated by the size setting unit 211.

The detection unit 202 ends the processing after repeatedly performing the above processing to perform the object detection processing for objects of various sizes. The detection unit 202 may end the processing after, for example, continuing the processing for a specified period of time even if the overall processing is not completed, or when the number of detected human bodies or the number of times of performing the human body detection processing becomes equal to or exceeds the set threshold.

Figure 12:
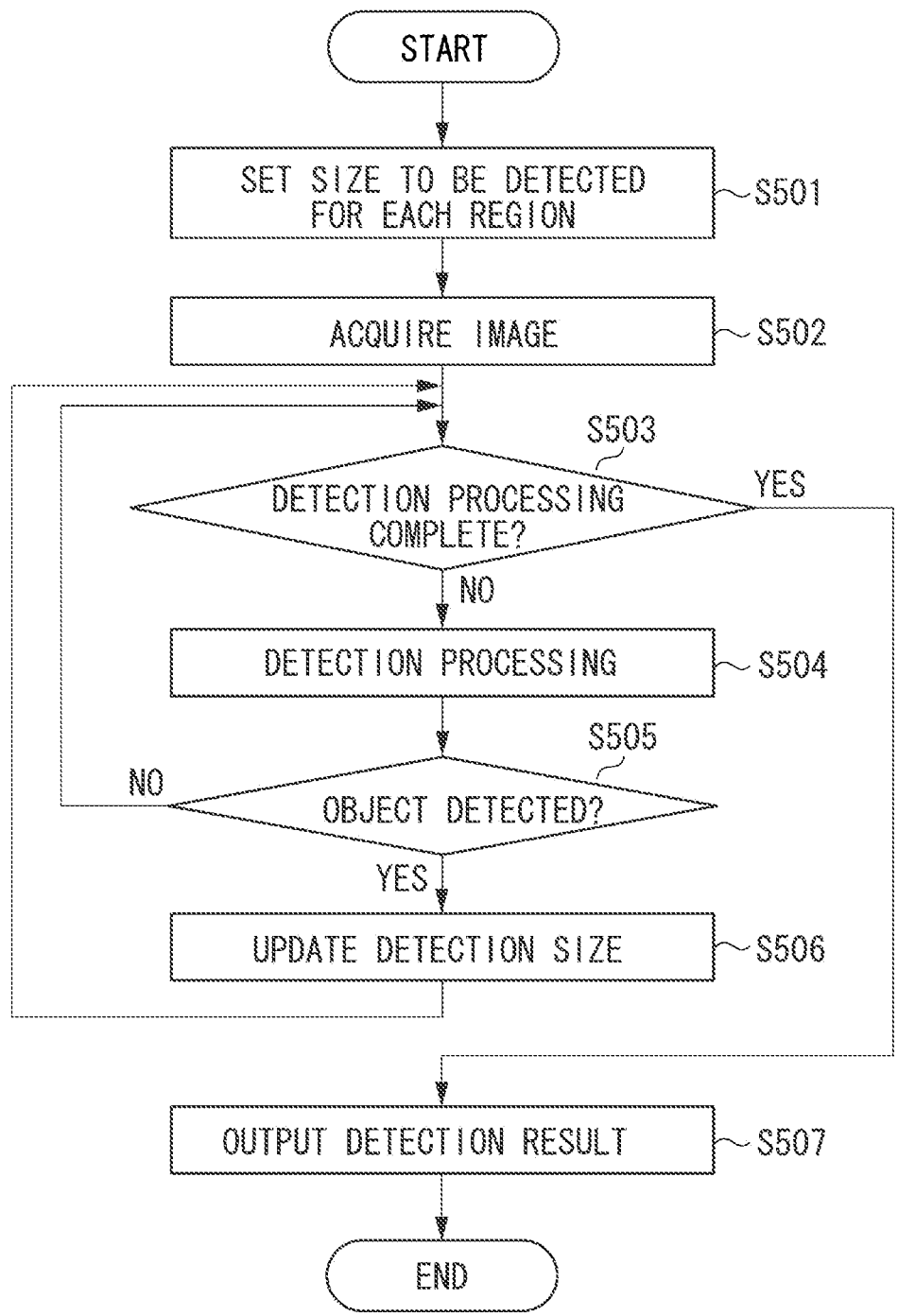
FIG. 12 is a flowchart illustrating processing for updating the detection size.

FIG. 12 is a flowchart illustrating an example of the processing of the image processing apparatus 120. Details of the processing of the image processing apparatus 120 in the present exemplary embodiment will be described with reference to FIG. 12.

In step S501, the size input unit 204 initializes the detection size for each region set in a detection processing target image via the size setting unit 211. The size input unit 204 accepts the designation of the detection size for each region in the detection processing target image based on, for example, a user's operation via an operation unit of the image processing apparatus 120. Then, the size input unit 204 instructs the size setting unit 211 to set the detection size indicated by the accepted designation as the initial value of the detection size of each region. The size setting unit 211 stores, as instructed, the value of the detection size indicated by the designation accepted by the size input unit 204 as the initial value of the detection size of each region in the auxiliary storage apparatus 103 or the like.

In step S502, the image acquisition unit 201 acquires an image supplied from outside. In the example of FIG. 11, the image acquisition unit 201 is assumed to have acquired a still image. Then, the image acquisition unit 201 transmits the acquired image to the detection unit 202. Then, the detection unit 202 starts the object detection processing on the image transmitted from the image acquisition unit 201.

In step S503, the detection control unit 210 determines whether the processing for detecting objects from the image acquired in step S502 is completed. If it is determined that the processing for detecting objects from the image acquired in step S502 is completed (YES in step S503), the processing proceeds to step S507. If it is determined that the processing for detecting objects from the image acquired in step S502 is not completed (NO in step S503), the processing proceeds to step S504.

In step S504, the determination unit 214 detects objects from the image acquired in step S502. The processing in step S504 is similar to the processing described with reference to FIG. 10. That is, the determination unit 214 selects any of the image acquired in step S502 and reduced images of the image. Then, the determination unit 214 detects objects of the size to be currently detected from the selected image by performing pattern matching using the identification pattern.

In step S505, the detection control unit 210 determines whether any object has been detected in the detection processing in step S504. If it is determined that an object has been detected in the detection processing in step S504 (YES in step S505), the detection control unit 210 transmits position information and size information of the object detected in step S504 to the size setting unit 211 and then the processing proceeds to step S506. If it is determined that no object has been detected in the detection processing in step S504 (NO in step S505), the processing returns to step S503.

In step S506, the size setting unit 211 identifies the region where the object has been detected from the position information of the detected object transmitted in step S505. Then, the size setting unit 211 updates information about the detection size corresponding to the identified region based on the size information of the detected object transmitted in step S505.

In step S507, the detection control unit 210 outputs, for example, information indicating detection results of objects from the image acquired in step S502 to an external output unit such as an external display. The external output unit outputs the output information by, for example, displaying the information.

In the present exemplary embodiment, as described above, the image processing apparatus 120 sets the initial value of information about the detection size indicating the size of objects on which the detection processing is performed, for each region set inside an object detection processing target image. Then, the image processing apparatus 120 detects an object of the size in the range indicated by the corresponding detection size for each region set inside the object detection processing target image, and updates information about the detection size each time an object is detected.

With the above processing, the image processing apparatus 120 can update the size of objects to be detected to an appropriate value for each region without using information about the distance between the image processing apparatus 120 and a subject. That is, the image processing apparatus 120 updates information about the detection size for the set region each time an object is detected so that execution of processing for detecting objects with unnecessary sizes can be eliminated. In addition, in the image processing apparatus 120, there is no need to set information such as the angle of view of the image capturing apparatus or the distance between the image capturing apparatus and a subject each time the arranging position of the image capturing apparatus is changed. Accordingly, the image processing apparatus 120 can speed up the object detection processing more easily.

In the present exemplary embodiment, the image processing apparatus is assumed to be an image capturing apparatus having the image processing function such as a monitoring camera. However, the image processing apparatus 120 may be an information processing apparatus such as a personal computer or a server apparatus that acquires an image captured by an external image capturing apparatus and performs image processing on the acquired image.

In the present exemplary embodiment, information about the detection size is assumed to be information about the minimum size and information about the maximum size of objects to be detected in the corresponding region. However, information about the detection size may be, for example, information about the median of the range of the size of objects to be detected and information about a width of the range.

In the present exemplary embodiment, the position of the identification pattern in the object detection processing target image is assumed to be the position of the pixel on the upper left corner of the identification pattern in the image. However, the position of the identification pattern in the object detection processing target image may be the position of another pixel such as the pixel in the center of the identification pattern.

In the present exemplary embodiment, the detection unit 202 performs the object detection processing by performing pattern matching using the identification pattern on the image to be detected and reduced images thereof. However, the detection unit 202 may perform the object detection processing by performing pattern matching on the image to be detected using the identification pattern and the identification pattern enlarged/reduced to the size of the detection size of each region.

In the present exemplary embodiment, the size setting unit 211 sets the detection size for each of a plurality of regions obtained by dividing the image acquired by the image acquisition unit 201. However, the size setting unit 211 may set the detection size for each region after setting as many regions intended for the detection processing as the set number (for example, one, two and so on) to the image acquired by the image acquisition unit 201. For example, the size setting unit 211 may set the detection size for the entire image acquired by the image acquisition unit 201 as one region. Also, the size setting unit 211 may set, for example, a rectangular region of a set size around the center of the image acquired by the image acquisition unit 201 and set the detection size for the region. In that case, the detection unit 202 does not perform the object detection processing for portions other than the rectangular region.

Also, the size setting unit 211 may accept the designation of the region to be detected based on an operation via the operation unit of the image processing apparatus 120 or designation information of the region from an external apparatus. Then, the size setting unit 211 may set the region indicated by the accepted designation as the region to be detected. In this manner, the image processing apparatus 120 performs the object detection processing only for the region desired by the user and does not perform the detection processing for other portions so that load of unnecessary processing can be reduced.

In an image acquired by the image acquisition unit 201, for example, human bodies as objects to be detected cannot be captured in a portion where only a wall can be shot. Thus, the image processing apparatus 120 may not perform the object detection processing for such a portion by excluding the portion from the region for setting the detection size. As a result, the image processing apparatus 120 can prevent load of unnecessary processing from increasing.

Detection settings of objects may be associated with and held for each preset position. Such an example will be described using a configuration obtained by adding the function of FIG. 8 to the image capturing apparatus 110 capable of changing an imaging angle of view. The imaging angle of view is a range captured by the image capturing apparatus 110. The output of the image capturing apparatus 110 is output to the image processing apparatus 120 functioning as a client apparatus. In this case, the size settings and the like described above are done by the client apparatus 120.

When the angle of view changes in the image capturing apparatus 110 due to pan/tilt zoom movement, the size of objects that can be shot in each region of an image acquired by the image acquisition unit 201 of the image capturing apparatus 110 also changes.

Thus, when the angle of view of the image capturing apparatus 110 changes, the size setting unit 211 updates information about the detection size managed by the size management unit 215 based on the change (pan/tilt zoom moving amount) in the angle of view of the image capturing apparatus 110. When the angle of view is changed to zoom twice, the size setting unit 211 updates the information about the detection size such that the minimum size and the maximum size of the detection size of each region are doubled.

After the information about the detection size is updated, the image capturing apparatus 110 detects objects based on the information about the updated detection size and repeats similar processing each time the angle of view of the image capturing apparatus 110 is changed (pan/tilt zoom movement).

With the above processing, when the angle of view of the image capturing apparatus 110 is changed, the image capturing apparatus 110 can appropriately update the detection size of each region in the detection processing target image.

When the angle of view of the image capturing apparatus 110 is set as a plurality of preset positions, the size management unit 215 may manage information about the detection size of each region individually for each preset position.

FIG. 13 is a diagram describing an example of the processing performed when the angle of view is changed. The example of FIG. 13 illustrates a state in which the angle of view at a preset position A, the angle of view at a preset position B, and the angle of view at a preset position C are set in advance for the image capturing apparatus 110. The size management unit 215 stores and manages detection size lists 611 to 613 listing information about the detection size of each region corresponding to each preset position in the memory 13. The detection unit 202 identifies which of the angle of view at the preset position A, the angle of view at the preset position B, and the angle of view at the preset position C the current angle of view of the image capturing apparatus 110 is. Then, the detection unit 202 detects objects using information about the detection size corresponding to the identified angle of view and updates information about the detection size using the result of the detection processing. Then, when the angle of view of the image capturing apparatus 110 is switched, the detection unit 202 switches information about the detection size used for the detection processing. When, for example, the angle of view at the preset position A is switched to the angle of view at the preset position B, the detection unit 202 switches information about the detection size to be used from the detection size list 611 to the detection size list 612. Then, the detection unit 202 detects objects using information about the switched detection size and updates information about the detection size using the detection result.

If the detection settings of objects are associated with and held for each preset position as described above, there is no need to reset the detection size each time the angle of view of the image capturing apparatus 110 changes so that load on the user can be reduced. The communication I/F 23 of the image processing apparatus 120 may output detection region settings and detection size settings to the communication I/F 14 of the image capturing apparatus.

A plurality of detection regions may automatically be set by the image processing apparatus 120. In the present exemplary embodiment, the size setting unit 211 sets a region to be subjected to the object detection processing in consideration of how objects are captured in an image to be subjected to the object detection processing. Hereinafter, the processing in the present exemplary embodiment will be described.

Figure 14A:
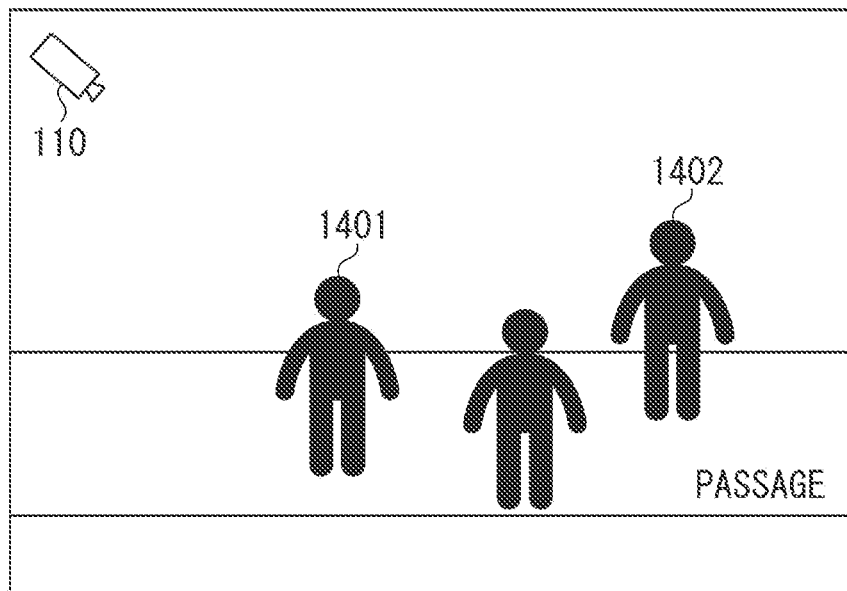
FIGS. 14A and 14B are schematic diagrams illustrating examples of captured images.
Figure 14B:
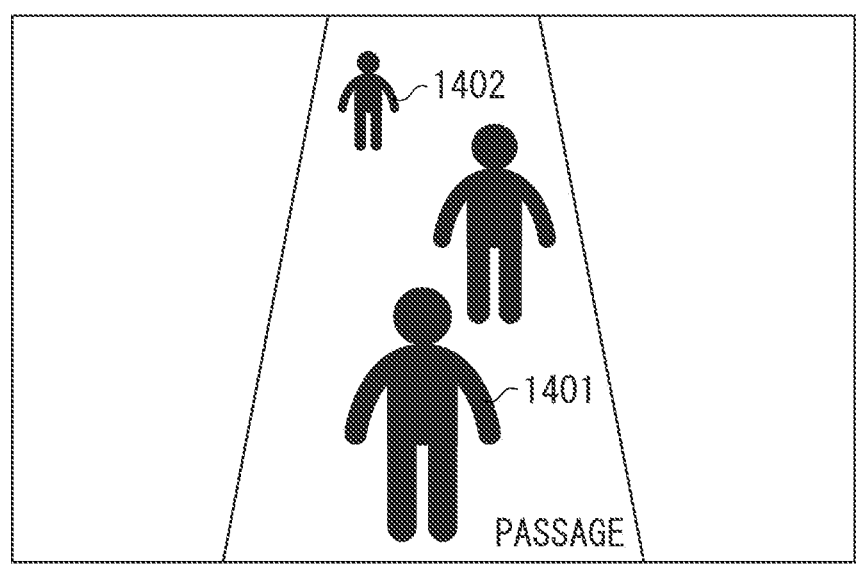

FIG. 14A is a diagram illustrating an example of the state in which the image capturing apparatus 110 is used for image capturing. In the example of FIG. 14A, the image capturing apparatus 110 captures an image of a plurality of persons including persons 1401 and 1402 present on a passage via the image capturing unit 11. FIG. 14B is an image captured by the image capturing apparatus 110 in the state of FIG. 14A.

In the example of FIG. 14A, the image capturing apparatus 110 is installed at an angle looking down at the passage obliquely below. In such an environment, an image captured by the image capturing apparatus 110 becomes an image whose lower portion is an image obtained by capturing a portion relatively close to the image capturing apparatus 110 and whose upper portion is an image obtained by capturing a portion relatively far from the image capturing apparatus 110. In the image of FIG. 14B, the person 1401 closest to the image capturing apparatus 110 is captured to be larger than the other persons and the person 1402 farthest from the image capturing apparatus 110 is captured to be smaller than the other persons. Thus, the closer a person is to the image capturing apparatus 110, the more unevenness is predicted to exist in size of persons in the image due to individual differences such as differences in height of persons. That is, larger unevenness in size of detected objects is predicted to exist in the lower portion of the image than in the upper portion of the image.

Figure 15:
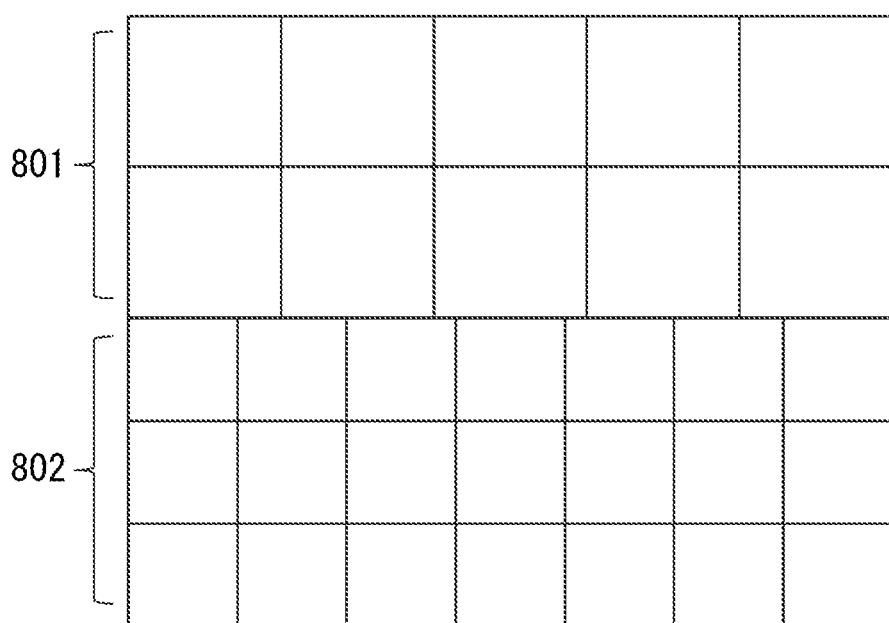
FIG. 15 is a schematic diagram illustrating an example of dividing an image into regions.

Based on such predictions, the size setting unit 211 of the image processing apparatus 120 sets regions to be subjected to the detection processing as described below for an image captured as if looking down at a plurality of persons. More specifically, the size setting unit 211 divides the image as illustrated in FIG. 15 and sets, to the image capturing apparatus 110, each divided region as a region to be subjected to the detection processing. In the example of FIG. 15, each region set in a lower region 802 of the image is smaller than each region set in an upper region 801 of the image. The detection unit 202 updates information about the detection size for each smaller region in the region 802 so that objects can be detected with greater precision than in the region 801.

If a plurality detection regions is made to be automatically set by the image processing apparatus 120 as described above, the image processing apparatus 120 can set the plurality of detection regions in consideration of how objects look in a captured image of the image capturing apparatus 110 and can set or update information of the detection size for each set region so that objects can be detected with greater precision.

In the above description, an example of displaying the maximum size and the minimum size has been described, but as illustrated in FIG. 10, a representative detection size (for example, the average size of the maximum size and the minimum size or the average size of a plurality of detected sizes) may be output for each region.

The output unit 203 causes the display apparatus 140 of the image processing apparatus 120 to display information about the detection size in real time or at a set timing so that the user can check the information about the detection size.

Figure 16A:
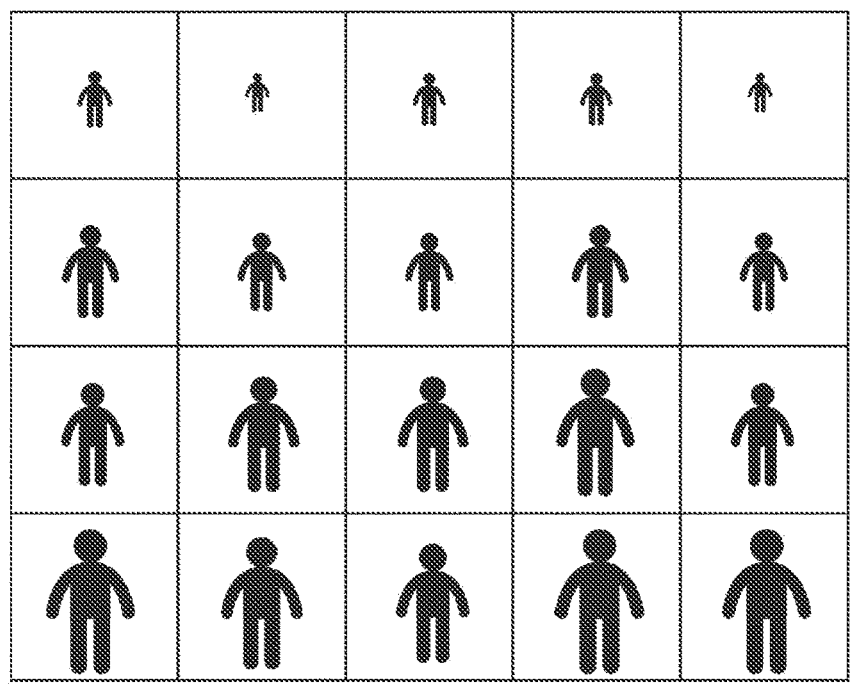
FIGS. 16A and 16B are schematic diagrams illustrating examples of displaying the size of an object to be detected set for each region.

FIG. 16A is a diagram illustrating an example of display results of the detection size. The output unit 203 calculates the average size of objects which are detection targets corresponding to each region from information about the detection size for the region. Then, the output unit 203 enlarges or reduces an object type icon in accordance with the calculated average size and displays the icon in each region of the image. Thus, the image processing apparatus 120 can enable the user to visually grasp the rough size of objects to be detected in each region by displaying the approximate size of the detection size of each region in association with each region.

Figure 16B:
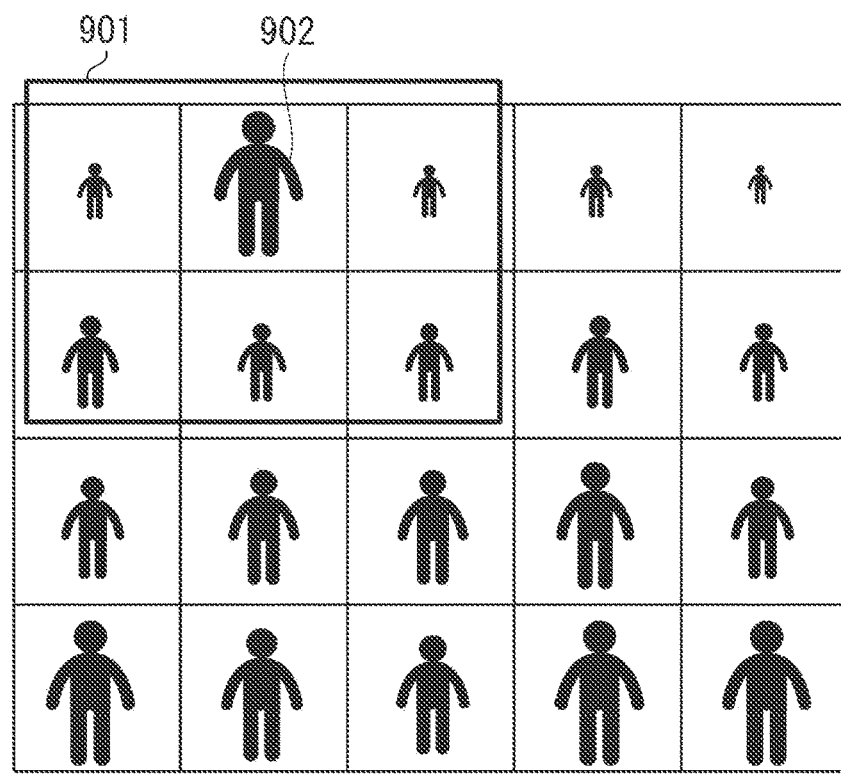

The detection size of each region is roughly determined by the angle of view. Thus, the detection sizes of neighboring regions are predicted to take closer values than the detection sizes of regions that are far apart. Therefore, if an icon 902 indicating a size deviating from the surroundings by a set threshold or more is present as in a range 901 in FIG. 16B, a failure of the update of the detection size can visually be recognized in the region corresponding to the icon 902. Accordingly, the image processing apparatus 120 can prompt the user to correct information about the detection size of a region where the update fails to take place properly as in the case of the detection size corresponding to the icon 902.

In the present invention, a program implementing one or more functions of the exemplary embodiment described above is supplied to a system or an apparatus via a network or a storage medium. Then, one or more functions can be implemented by processing in which one or more processors of a computer of the system or the apparatus reads and executes the program. Also, the invention can be implemented by a circuit (for example, application specific integrated circuit (ASIC)) that implements one or more functions.

In the foregoing, an example of the exemplary embodiment of the present invention has been described in detail, but the present invention is not limited to a specific exemplary embodiment.

A portion or all of the functional configuration of the image capturing apparatus 110 may be implemented in the image capturing apparatus 110 as the hardware configuration. Similarly, a portion or all of the functional configuration of the client apparatus 120 may be implemented in the client apparatus 120 as the hardware configuration. The hardware configurations of the client apparatus and the image capturing apparatus described above are by way of example and, for example, a plurality of CPUs, memories, or communication I/Fs may be provided.

Also in the exemplary embodiment described above, a human body is taken as an example of the detection target, but the detection target may be any other object, for example, an automobile or an animal.

According to the processing of each exemplary embodiment described above, at least one of the speeding-up of the detection processing and the reduction of misdetection can be implemented.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-014208, filed Jan. 30, 2017, and No. 2017-102803, filed May 24, 2017, which are hereby incorporated by reference herein in their entirety.

What is claimed is:

1. An information processing apparatus for providing a setting screen of object detection processing on an image or a plurality of images comprising a video, the information processing apparatus comprising:
   a first setting unit configured to set, based on a user instruction, a detection area for object detection in a captured image captured by a monitoring camera;
   a second setting unit configured to set, based on a user instruction, a minimum size and a maximum size for the detection area, such that information indicating an object a size of which is between the minimum size and the maximum size is output as a result of the object detection in the detection area; and a display controlling unit configured to cause a display unit to display the setting screen including an image, captured by the monitoring camera, on which a first guide representing the minimum size, a second guide representing the maximum size, and a mark representing the detection area are superimposed, wherein the first guide, the second guide, and the mark are superimposed on the image in the setting screen, such that the second guide is displayed at a position below the first guide and such that each of the first guide and the second guide overlaps the detection area shown by the mark, wherein the maximum size and the minimum size are changeable based on a user instruction performed in a size setting mode, wherein the detection area is changeable based on a user instruction performed in an area setting mode different from the size setting mode, and wherein the first guide and the second guide displayed in the setting screen in the size setting mode are not translucent, and the first guide and the second guide displayed in the setting screen in the area setting mode are translucent.

2. The information processing apparatus according to claim 1, further comprising a detection unit configured to detect an object, in the detection area in an image captured by the monitoring camera, a size of which is between the minimum size and the maximum size.

3. The information processing apparatus according to claim 1, wherein the object is a human body.

4. The information processing apparatus according to claim 1, wherein the first setting unit is configured to set a plurality of the detection areas in an image captured by the monitoring camera, and wherein the second setting unit sets the minimum size and the maximum size for each of the detection areas set by the first setting unit.

5. The information processing apparatus according to claim 1, wherein a size of the second guide displayed on the display unit is larger than a size of the first guide displayed on the display unit.

6. A control method for an information processing apparatus for providing a setting screen of object detection processing on an image or a plurality of images comprising a video, the method comprising:

setting, based on a user instruction, a detection area for object detection in an image captured by a monitoring camera;

setting, based on a user instruction, a minimum size and a maximum size for the detection area, such that information indicating an object a size of which is between the minimum size and the maximum size is output as a result of the object detection in the detection area; and causing a display unit to display the setting screen including an image, captured by the monitoring camera, on which a first guide representing the minimum size, a second guide representing the maximum size, and a mark representing the detection area are superimposed, wherein the first guide, the second guide, and the mark are superimposed on the image in the setting screen, such that the second guide is displayed at a position below the first guide and such that each of the first guide and the second guide overlaps the given detection area shown by the mark, wherein the maximum size and the minimum size are changeable based on a user instruction performed in a size setting mode, wherein the detection area is changeable based on a user instruction performed in an area setting mode different from the size setting mode, and wherein the first guide and the second guide displayed in the setting screen in the size setting mode are not translucent, and the first guide and the second guide displayed in the setting screen in the area setting mode are translucent.

7. A non-transitory computer readable storage medium storing a program to cause a computer to execute an information processing method for providing a setting screen of object detection processing on an image or a plurality of images comprising a video, the method comprising:

setting, based on a user instruction, a detection area for object detection in an image captured by a monitoring camera;

setting, based on a user instruction, a minimum size and a maximum size for the detection area, such that information indicating an object a size of which is between the minimum size and the maximum size is output as a result of the object detection in the detection area; and causing a display unit to display the setting screen including an image, captured by the monitoring camera, on which a first guide representing the minimum size, a second guide representing the maximum size, and a mark representing the detection area are superimposed, wherein the first guide, the second guide, and the mark are superimposed on the image in the setting screen, such that the second guide is displayed at a position below the first guide and such that each of the first guide and the second guide overlaps the given detection area shown by the mark, wherein the maximum size and the minimum size are changeable based on a user instruction performed in a size setting mode, wherein the detection area is changeable based on a user instruction performed in an area setting mode different from the size setting mode, and wherein the first guide and the second guide displayed in the setting screen in the size setting mode are not translucent, and the first guide and the second guide displayed in the setting screen in the area setting mode are translucent.

8. An information processing apparatus according to claim 1, wherein the display controlling unit causes the display unit to display the information indicating the object as the result of the object detection.

9. The information processing apparatus according to claim 1, wherein the display controlling unit causes the display unit to display the second guide at a position below the first guide, such that the first guide and the second guide do not overlap each other.

10. The information processing apparatus according to claim 1, wherein the display controlling unit causes the display unit to display the captured image on which the first guide, the second guide, and the mark are superimposed such that the first guide overlaps an upper part of an edge of the mark and the second guide overlaps a lower part of the edge of the mark.

11. The information processing apparatus according to claim 1, wherein the display controlling unit causes the display unit to display the captured image on which the first guide and the second guide are superimposed such that a center of the second guide is located at a position below a center of the first guide.

12. The control method according to claim 6, further comprising detecting an object, in the detection area, a size of which is between the minimum size and the maximum size.

13. The control method according to claim 6, wherein a plurality of the detection areas are set in an image captured by a monitoring camera, and
wherein the minimum size and the maximum size for each of the detection areas is set.

14. The control method according to claim 6, wherein a size of the second guide displayed on the display unit is larger than a size of the first guide displayed on the display unit.

15. The control method according to claim 6, wherein the display unit is caused to display the information indicating the object as the result of the object detection.

16. The control method according to claim 6, wherein the display unit is caused to display the second guide at a position below the first guide, such that the first guide and the second guide do not overlap each other.

17. The control method according to claim 6, wherein the display unit is caused to display the captured image on which the first guide, the second guide, and the mark are superimposed such that the first guide overlaps an upper part of an edge of the mark and the second guide overlaps a lower part of the edge of the mark.

18. The control method according to claim 6, wherein the display unit is caused to display the captured image on which the first guide and the second guide are superimposed such that a center of the second guide is located at a position below a center of the first guide.

19. The information processing apparatus according to claim 1, wherein the first guide overlaps a top area within the mark and the second guide overlaps a bottom area within the mark.

20. The information processing apparatus according to claim 1, wherein the setting screen includes a first symbol for indicating whether the area setting mode is selected and the second symbol for indicating whether the size setting mode is selected,
wherein an appearance of the first symbol is different depending on whether the area setting mode is selected or not, and an appearance of the second symbol is different depending on whether the size setting mode is selected or not.

21. The information processing apparatus according to claim 1, wherein the monitoring camera is installed at a height and angle such that a subtended angle for an object appearing in the image increases as the object appears lower in the image and the subtended angle for the object decreases as the object appears higher in the image.

* * * * *